(12) United States Patent
Nishina

(10) Patent No.: US 12,134,190 B2
(45) Date of Patent: Nov. 5, 2024

(54) GRASPING POSITION AND ORIENTATION REGISTRATION DEVICE, GRASPING POSITION AND ORIENTATION REGISTRATION METHOD, AND PROGRAM

(71) Applicant: OMRON Corporation, Kyoto (JP)

(72) Inventor: Yuki Nishina, Kyoto (JP)

(73) Assignee: OMRON Corporation, Kyoto (JP)

( * ) Notice: Subject to any disclaimer, the term of this patent is extended or adjusted under 35 U.S.C. 154(b) by 300 days.

(21) Appl. No.: 17/272,487

(22) PCT Filed: Mar. 15, 2019

(86) PCT No.: PCT/JP2019/010976
§ 371 (c)(1),
(2) Date: Mar. 1, 2021

(87) PCT Pub. No.: WO2020/188660
PCT Pub. Date: Sep. 24, 2020

(65) Prior Publication Data
US 2021/0394361 A1    Dec. 23, 2021

(51) Int. Cl.
*B25J 9/16* (2006.01)

(52) U.S. Cl.
CPC ........... *B25J 9/1612* (2013.01); *B25J 9/1666* (2013.01); *G05B 2219/39001* (2013.01); *G05B 2219/39536* (2013.01)

(58) Field of Classification Search
None
See application file for complete search history.

(56) References Cited

U.S. PATENT DOCUMENTS

| | | | |
|---|---|---|---|
| 2007/0152619 A1 | 7/2007 | Sugiyama et al. | |
| 2011/0010009 A1* | 1/2011 | Saito | B25J 9/1612 703/13 |
| 2012/0253512 A1 | 10/2012 | Sato | |

(Continued)

FOREIGN PATENT DOCUMENTS

| CN | 1982000 A | 6/2007 |
|---|---|---|
| CN | 103158151 A | 6/2013 |

(Continued)

OTHER PUBLICATIONS

Extended European Search Report issued in European Appln. No. 19919706.2 mailed Feb. 17, 2022.

(Continued)

*Primary Examiner* — Peter D Nolan
*Assistant Examiner* — Jacob Kent Besteman-Street
(74) *Attorney, Agent, or Firm* — ROSSI, KIMMS & McDOWELL LLP

(57) ABSTRACT

The rotation center is calculated (step S11). A gripping pattern is determined (step S12). The rotation axis is set to X-axis (step S13) of a tool coordinate system in response to the gripping pattern being a fan-shaped pattern, to Y-axis (step S14) in response to being a cylinder pattern, and to Z-axis (step S15) in response to being a circle pattern. A start angle $\theta\_start$ is set as a rotation angle $\theta$ (step S16). The pose of a tool is calculated (step S17). The current pose is registered (step S18). The angle $\theta$ is changed by a predetermined angle of $\Delta\theta$ (step S19). Steps S17 to S19 are repeated until the angle $\theta$ reaches an end angle $\theta\_end$ (step S20).

17 Claims, 26 Drawing Sheets

(56) References Cited

U.S. PATENT DOCUMENTS

| | | |
|---|---|---|
| 2013/0158710 A1 | 6/2013 | Oda |
| 2015/0025682 A1 | 1/2015 | Sato |
| 2015/0120054 A1 | 4/2015 | Watanabe |
| 2016/0354928 A1 | 12/2016 | Shimodaira et al. |

FOREIGN PATENT DOCUMENTS

| | | | | |
|---|---|---|---|---|
| CN | 106217373 A | 12/2016 | | |
| CN | 106231046 A | 12/2016 | | |
| DE | 102017108727 B4 | * 8/2021 | ................ | B25J 9/16 |
| JP | 2009214212 A | 9/2009 | | |
| JP | 4835616 B2 | 12/2011 | | |
| JP | 2012206219 A | 10/2012 | | |
| JP | 2014240106 A | 12/2014 | | |
| JP | 2015085475 A | 5/2015 | | |
| JP | 5888591 B2 | 3/2016 | | |
| JP | 2018144159 A | 9/2018 | | |
| WO | 2015178377 A1 | 11/2015 | | |
| WO | 2018193130 A1 | 10/2018 | | |

OTHER PUBLICATIONS

International Search Report issued in Intl. Appln. No. PCT/JP2019/010976 mailed May 28, 2019. English translation provided.
Written Opinion issued in Intl. Appln. No. PCT/JP2019/010976 mailed May 28, 2019. English translation provided.
Office Action issued in Chinese Appln. No. 201980054095.6, mailed Dec. 6, 2023. English translation provided.

* cited by examiner

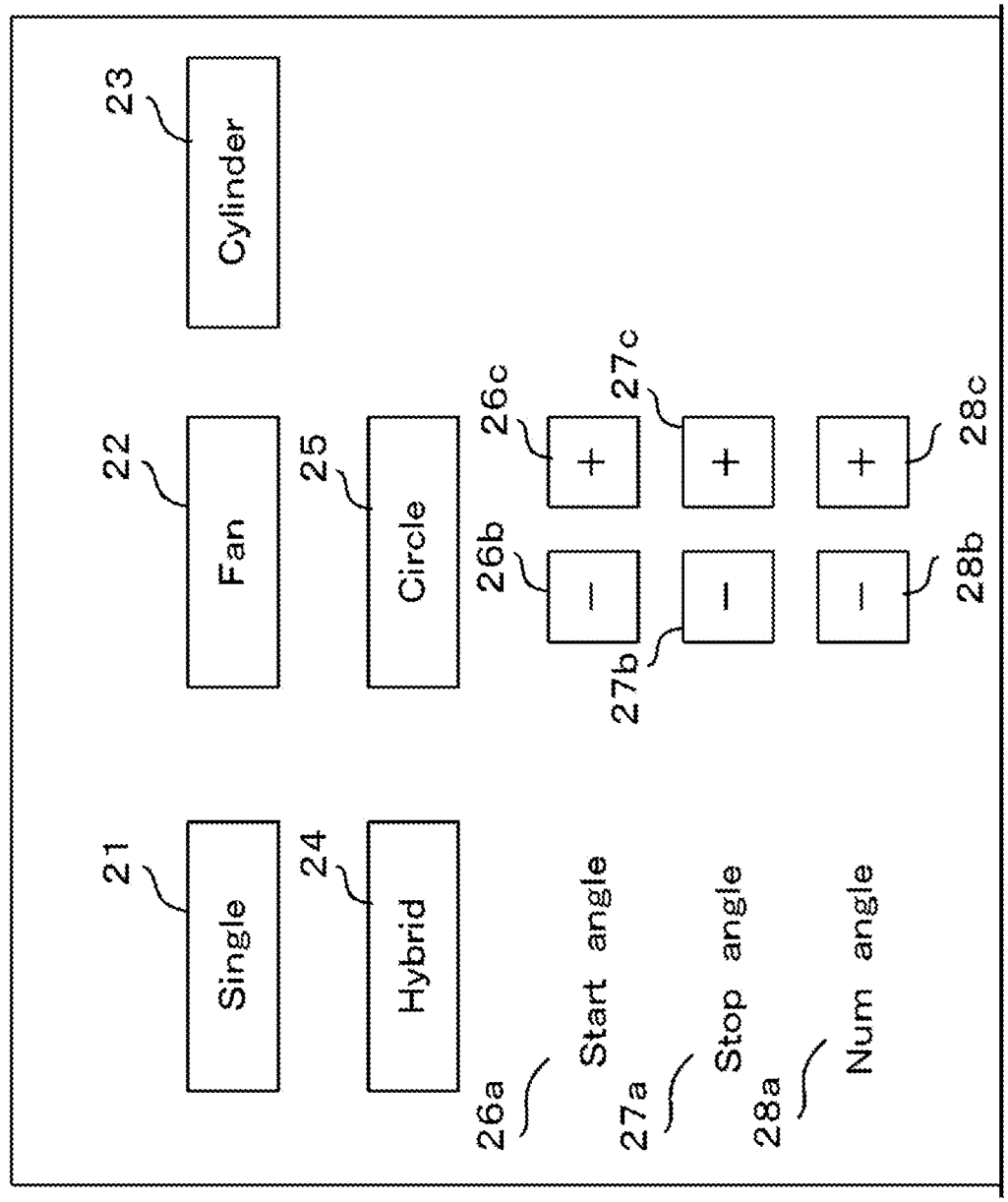

Initial pose

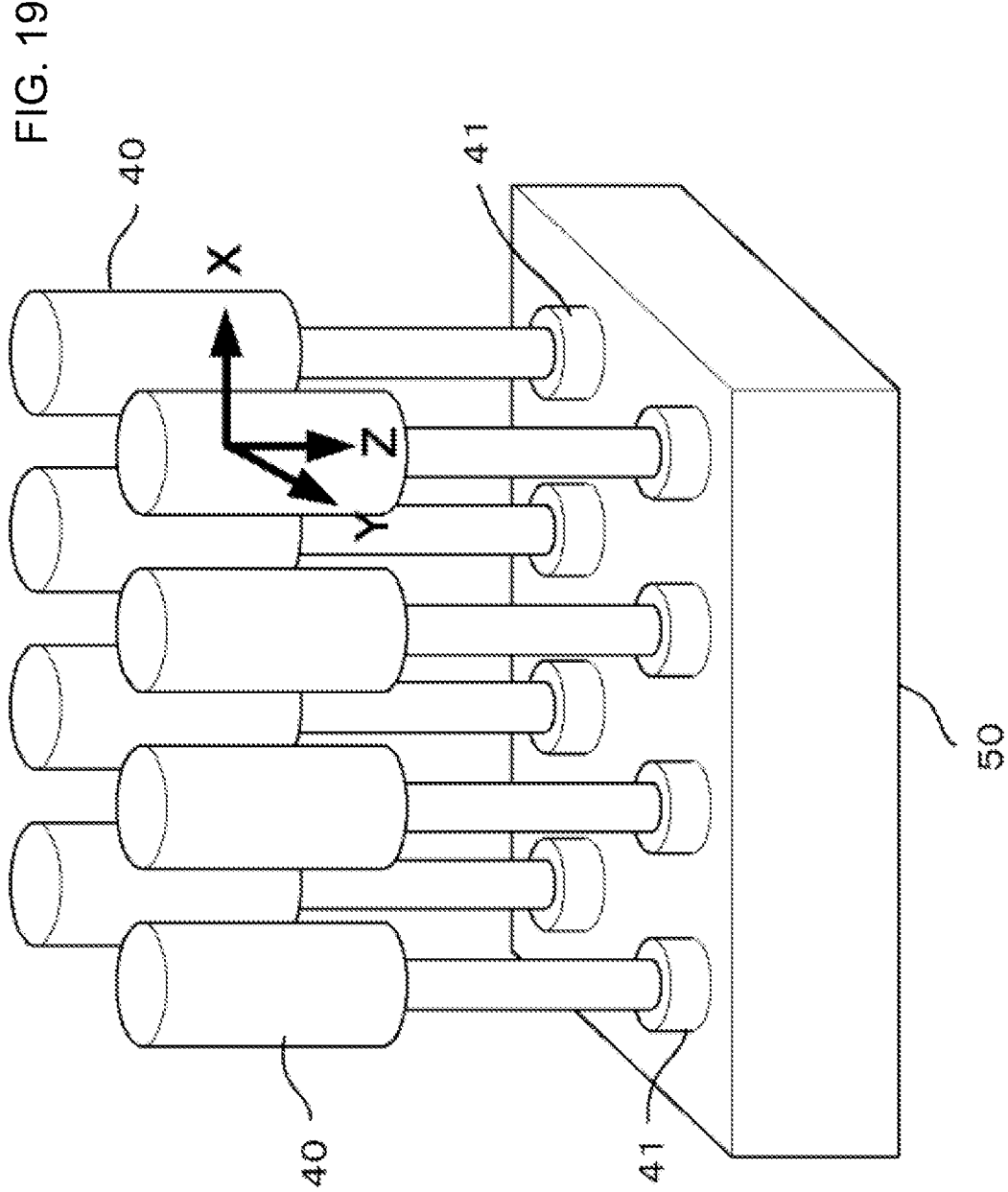

GRASPING POSITION AND ORIENTATION REGISTRATION DEVICE, GRASPING POSITION AND ORIENTATION REGISTRATION METHOD, AND PROGRAM

FIELD

The present invention relates to a gripping pose registration apparatus, a gripping pose registration method, and a gripping pose registration program.

BACKGROUND

Techniques have been developed to display a gripping target and a robot hand three-dimensionally in software and register a gripping position in response to a user designating a gripping pose (refer to, for example, Patent Literature 1).

Techniques have also been developed to determine a gripping position for a robot hand by applying a gripping pattern obtained through fitting of a primitive shape to data representing a gripping target using a preset database storing primitive shape models and their corresponding gripping patterns (refer to, for example, Patent Literature 2).

With the technique described in Patent Literature 1, registering multiple gripping positions takes an enormous amount of time. With the technique described in Patent Literature 2, gripping targets with complex shapes cannot be fit to any appropriate primitive shapes.

CITATION LIST

Patent Literature

Patent Literature 1: Japanese Patent No. 5888591
Patent Literature 2: Japanese Patent No. 4835616

SUMMARY

Technical Problem

In response to the above issue, one or more aspects of the present invention are directed to a technique for allowing a user to collectively register multiple gripping poses of a robot hand relative to a gripping target, and to apply a gripping pattern as appropriate for any shape of a gripping target.

Solution to Problem

In response to the above issue, a gripping pose registration apparatus according to an aspect of the present invention is a gripping pose registration apparatus for registering a gripping pose of a robot hand relative to a gripping target. The gripping pose registration apparatus includes a gripping pose setting unit that receives setting of a gripping pose of the robot hand relative to the gripping target represented three-dimensionally, a gripping pattern designator that receives designation of a type of a gripping pattern including a group of gripping poses, a gripping pattern generator that generates, based on the designated type and the set gripping pose of the robot hand, the gripping pattern including the group of gripping poses generated from at least one of rotation about a predetermined axis in a tool coordinate system defined for the robot hand or translation in a predetermined direction in the tool coordinate system, and a gripping pose storage unit that stores the group of gripping poses included in the generated gripping pattern.

The above aspect of the present invention allows a user to set a gripping pose of a robot hand relative to a gripping target represented three-dimensionally and designate a type of a gripping pattern to automatically generate, based on the designated pattern and the set gripping pose of the robot hand, a gripping pattern including a group of gripping poses generated from at least one of rotation about a predetermined axis in a tool coordinate system or translation in a predetermined direction in the tool coordinate system. More specifically, the above aspect of the present invention allows a user to set a gripping pose of a robot hand relative to a gripping target represented three-dimensionally and designate a type of a gripping pattern, to obtain information for generating a group of gripping poses included in a gripping pattern, thus allowing collective registration of multiple gripping poses in accordance with the designated pattern. Moreover, the user can apply a gripping pattern as appropriate for any shape of the gripping target.

A robot hand herein refers to a tool that is computer-controllable to grip a gripping target. Examples include an end effector and a gripper. Gripping refers to holding a target. Examples include, but are not limited to, holding by grasping and holding by sucking. A group of gripping poses includes one or more gripping poses of a robot hand relative to a gripping target. A group of gripping poses is defined as above because a gripping pattern may include a single gripping pose.

The group of gripping poses included in the gripping pattern is generated from, using a set robot hand as a reference, at least one of rotation about a predetermined axis in a tool coordinate system or translation in a predetermined direction in the tool coordinate system. The group of gripping poses may include a gripping pose shifted from the set robot hand by a predetermined angle or a predetermined distance. The set gripping pose of the robot hand may or may not be included in the group of gripping poses included in the generated gripping pattern.

The group of gripping poses included in the gripping pattern may be generated from, based on the set gripping pose of the robot hand, rotation about a predetermined axis in a tool coordinate system defined for the robot hand or translation in a predetermined direction in the tool coordinate system. The group of gripping poses included in the gripping pattern may be generated from rotation about a predetermined axis and translation in a predetermined direction in the tool coordinate system. Moreover, the rotation may combine rotation about a predetermined axis and rotation about another axis, and the translation may combine translation in a predetermined direction and translation in another direction.

In the above aspect of the present invention, the type of the gripping pattern may include a first type of the gripping pattern including the group of gripping poses generated with an axis in a direction connecting two gripper parts of the robot hand being the predetermined axis.

This structure generates a gripping pattern that includes a group of gripping poses generated from rotation about an axis in a direction connecting two gripper parts gripping a gripping target, and thus allows collective registration of gripping poses at various angles.

In the above aspect of the present invention, the type of the gripping pattern may include a second type of the gripping pattern including the group of gripping poses generated with an axis orthogonal to a longitudinal direction of two gripper parts of the robot hand being the predetermined axis.

This structure allows collective registration of gripping poses in a direction orthogonal to the central axis of a cylindrical or tubular gripping target. The direction orthogonal to the longitudinal direction of the two gripper parts herein refers to a direction orthogonal to a plane including a straight line extending in the longitudinal direction of each of the two gripper parts.

In the above aspect of the present invention, the type of the gripping pattern may include a third type of the gripping pattern including the group of gripping poses generated with an axis parallel to a longitudinal direction of a gripper part of the robot hand being the predetermined axis.

This structure allows collective registration of gripping poses at various angles for internal-diameter gripping, in which the gripper parts are placed inside a hole of a gripping target, such as a through-hole or a recess, to grip the gripping target from inside.

In the above aspect of the present invention, the type of the gripping pattern may include a fourth type of the gripping pattern including the group of gripping poses generated by combining rotation about an axis in a direction connecting two gripper parts of the robot hand being the predetermined axis and rotation about an axis parallel to a longitudinal direction of at least one of the gripper parts being the predetermined axis or rotation about an axis orthogonal to a longitudinal direction of the two gripper parts being the predetermined axis.

This structure allows collective registration of gripping poses in a direction orthogonal to the central axis of a cylindrical or tubular gripping target and in various directions each at an angle to the central axis of the gripping target.

In the above aspect of the present invention, the type of the gripping pattern may include a fifth type of the gripping pattern including the group of gripping poses generated with a direction orthogonal to a longitudinal direction of a gripper part of the robot hand being the predetermined direction.

This structure allows collective registration of gripping poses for gripping a flat portion of a flat gripping target. This structure can be used for a robot hand having a suction pad.

In the above aspect of the present invention, the gripping pattern designator may receive designation of a plurality of the types of the gripping pattern for a single gripping target.

This structure allows registration of gripping patterns appropriate for portions of the gripping target.

The gripping pose registration apparatus according to the above aspect of the present invention may further include a parameter setting unit that receives setting of a parameter for generating the gripping pattern. The parameter may include a gripping depth indicating a position of the axis orthogonal to the longitudinal direction of the two gripper parts.

This structure allows adjustment of the gripping depth of the gripper parts with respect to the gripping target.

The gripping pose registration apparatus according to the above aspect of the present invention may further include a parameter setting unit that receives setting of a parameter for generating the gripping pattern.

This structure allows the parameter setting to adjust the details of a gripping pattern or the process for generating a gripping pattern as intended by the user.

In the above aspect of the present invention, the parameter may include at least one of a start parameter for specifying a gripping pose with which the rotation or the translation is started in generating the gripping pattern or an end parameter for specifying a gripping pose with which the rotation or the translation is ended in generating the gripping pattern.

This structure defines a range of the group of gripping poses included in the gripping pattern. To avoid collision of the robot hand with a protrusion or any other portion of a gripping target or to exclude any specified gripping poses such as a gripping pose at an angle that may cause unstable gripping, such gripping poses can be excluded from a gripping pattern to be generated.

Such start parameters or end parameters may include angles or positions.

In the above aspect of the present invention, the parameter may include a unit parameter for specifying a unit for the rotation or the translation of the robot hand for generating the group of gripping poses.

The robot hand may be rotated or translated in smaller units to generate a group of gripping poses including more gripping poses to be registered. However, this increases the processing load. The user may adjust this trade-off by setting an appropriate unit using an appropriate unit parameter. A unit of angle may be used herein for rotation, and a unit of distance may be used for translation. The unit parameters may be the angle or the distance specified directly, or may be the number of partitions in a range that indirectly specify the parameters.

In the above aspect of the present invention, the gripping pattern generator may determine, in generating the gripping pattern, whether the robot hand collides with the gripping target and exclude a gripping pose with which the robot hand collides with the gripping target from the set of gripping poses.

This structure eliminates an adjustment by the user to avoid collision between the gripping target and the robot hand.

The gripping pose registration apparatus according to the above aspect of the present invention may further include a rendering unit that generates rendering information for displaying the gripping pattern generated by the gripping pattern generator.

This structure allows the user to view an image of the generated gripping pattern.

The gripping pose registration apparatus according to the above aspect of the present invention may further include a representation mode designator that receives, as the rendering information, designation of a representation mode including a simplified mode for representing an outline of the robot hand corresponding to a gripping pose included in the gripping pattern.

This structure allows selection of a simplified representation mode to increase the visibility for any less visible overlapping images of the robot hand corresponding to each gripping pose included in the gripping pattern. Representation modes may be set as appropriate to, for example, a more stereoscopic representation mode, in addition to the simplified mode.

In the above aspect of the present invention, the gripping pose storage unit may receive designation of a gripping pose to be stored from among the group of gripping poses included in the gripping pattern represented three-dimensionally.

This structure allows the user to select, from the group of gripping poses included in the generated gripping pattern, gripping poses to be stored and register the selected gripping poses. Either gripping poses to be stored or gripping poses not to be stored may be selected. This eliminates an operation to specify a unit for generating a gripping pattern.

A gripping pose registration method according to another aspect of the present invention is a gripping pose registration method for registering a gripping pose of a robot hand relative to a gripping target. The gripping pose registration method includes receiving setting of a gripping pose of the robot hand relative to the gripping target represented three-dimensionally, receiving designation of a type of a gripping pattern including a group of gripping poses, generating, based on the designated type and the set gripping pose of the robot hand, the gripping pattern including the group of gripping poses generated from at least one of rotation about a predetermined axis in a tool coordinate system defined for the robot hand or translation in a predetermined direction in the tool coordinate system, and storing the group of gripping poses included in the generated gripping pattern.

The above aspect of the present invention allows a user to set a gripping pose of a robot hand relative to a gripping target represented three-dimensionally and designate a type of a gripping pattern to automatically generate, based on the designated pattern and the set gripping pose of the robot hand, a gripping pattern including a group of gripping poses generated from at least one of rotation about a predetermined axis in a tool coordinate system or translation in a predetermined direction in the tool coordinate system. More specifically, the above aspect of the present invention allows a user to set a gripping pose of a robot hand relative to a gripping target represented three-dimensionally and designate a type of a gripping pattern, to obtain information for generating a group of gripping poses included in a gripping pattern, thus allowing collective registration of multiple gripping poses in accordance with the designated pattern. Moreover, the user can apply a gripping pattern as appropriate for any shape of the gripping target.

A robot hand herein refers to a tool that is computer-controllable to grip a gripping target. Examples include an end effector and a gripper. Gripping refers to holding a target. Examples include, but are not limited to, holding by grasping and holding by sucking. A group of gripping poses includes one or more gripping poses of a robot hand relative to a gripping target. A group of gripping poses is defined as above because a gripping pattern may include a single gripping pose.

The group of gripping poses included in the gripping pattern is generated, using a set robot hand as a reference, at least one of rotation about a predetermined axis in a tool coordinate system or translation in a predetermined direction in the tool coordinate system. The group of gripping poses may include a gripping pose shifted from the set gripping pose of the robot hand by a predetermined angle or a predetermined distance. The set robot hand may or may not be included in the group of gripping poses included in the generated gripping pattern.

The group of gripping poses included in the gripping pattern may be generated from, based on the set gripping pose of the robot hand, rotation about a predetermined axis in a tool coordinate system defined for the robot hand or translation in a predetermined direction in the tool coordinate system. The group of gripping poses included in the gripping pattern may be generated from rotation about a predetermined axis and translation in a predetermined direction in the tool coordinate system. Moreover, the rotation may combine rotation about a predetermined axis and rotation about another axis, and the translation may combine translation in a predetermined direction and translation in another direction.

A program according to still another aspect of the present invention is a program for causing a computer to implement a gripping pose registration method for registering a gripping pose of a robot hand relative to a gripping target. The program causes the computer to perform operations including receiving setting of a gripping pose of the robot hand relative to the gripping target represented three-dimensionally, receiving designation of a type of a gripping pattern including a group of gripping poses, generating, based on the designated type and the set gripping pose of the robot hand, the gripping pattern including the group of gripping poses generated from at least one of rotation about a predetermined axis in a tool coordinate system defined for the robot hand or translation in a predetermined direction in the tool coordinate system, and storing the group of gripping poses included in the generated gripping pattern.

The above aspect of the present invention allows a user to set a gripping pose of a robot hand relative to a gripping target represented three-dimensionally and designate a type of a gripping pattern to automatically generate, based on the designated pattern and the set gripping pose of the robot hand, a gripping pattern including a group of gripping poses generated from at least one of rotation about a predetermined axis in a tool coordinate system or translation in a predetermined direction in the tool coordinate system. More specifically, the above aspect of the present invention allows a user to set a gripping pose of a robot hand relative to a gripping target represented three-dimensionally and designate a type of a gripping pattern, to obtain information for generating a group of gripping poses included in a gripping pattern, thus allowing collective registration of multiple gripping poses in accordance with the designated pattern. Moreover, the user can apply a gripping pattern as appropriate for any shape of the gripping target.

A robot hand herein refers to a tool that is computer-controllable to grip a gripping target. Examples include an end effector and a gripper. Gripping refers to holding a target. Examples include, but are not limited to, holding by grasping and holding by sucking. A group of gripping poses includes one or more gripping poses of a robot hand relative to a gripping target. A group of gripping poses is defined as above because a gripping pattern may include a single gripping pose.

The group of gripping poses included in the gripping pattern is generated from, using a set robot hand as a reference, at least one of rotation about a predetermined axis in a tool coordinate system or translation in a predetermined direction in the tool coordinate system. The group of gripping poses may include a gripping pose shifted from the set robot hand by a predetermined angle or a predetermined distance. The set gripping pose of the robot hand may or may not be included in the group of gripping poses included in the generated gripping pattern.

The group of gripping poses included in the gripping pattern may be generated from, based on the set gripping pose of the robot hand, rotation about a predetermined axis in a tool coordinate system defined for the robot hand or translation in a predetermined direction in the tool coordinate system. The group of gripping poses included in the gripping pattern may be generated from rotation about a predetermined axis and translation in a predetermined direction in the tool coordinate system. Moreover, the rotation may combine rotation about a predetermined axis and rotation about another axis, and the translation may combine translation in a predetermined direction and translation in another direction.

Advantageous Effects

The above aspects of the present invention allows a user to collectively register multiple gripping poses of a robot hand relative to a gripping target, and to apply a gripping pattern as appropriate for any shape of a gripping target.

BRIEF DESCRIPTION OF THE DRAWINGS

FIG. 7 is a diagram of a user interface for setting a gripping pattern in the embodiment of the present invention.

FIG. 19 is a diagram showing the equal-interval gripping pattern in the embodiment of the present invention.

DETAILED DESCRIPTION

First Embodiment

A gripping pose registration apparatus according to an embodiment of the present invention will now be described in more detail with reference to the drawings.

Apparatus Structure

Figure 1:
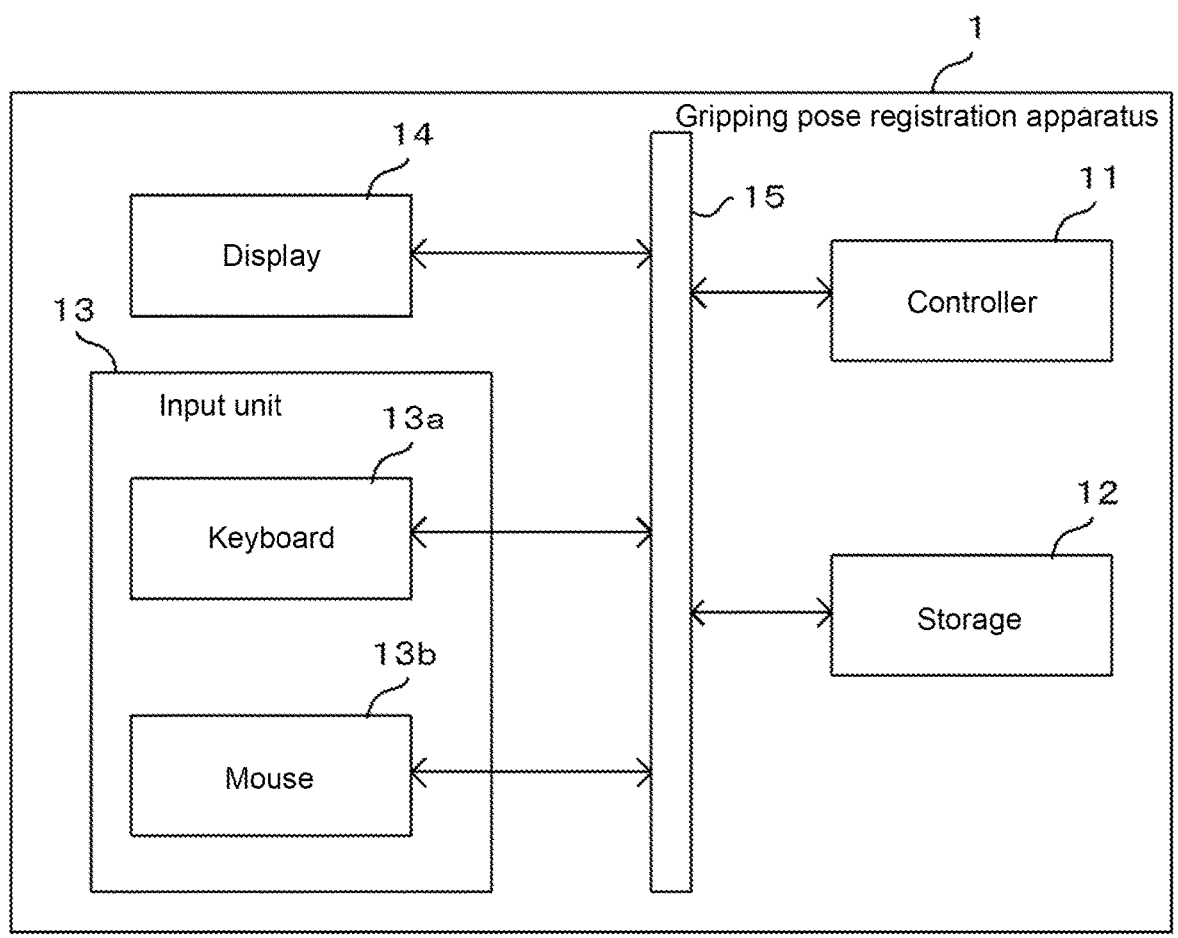
FIG. 1 is a block diagram of a gripping pose registration apparatus according to an embodiment of the present invention showing its example hardware configuration.
Figure 2:
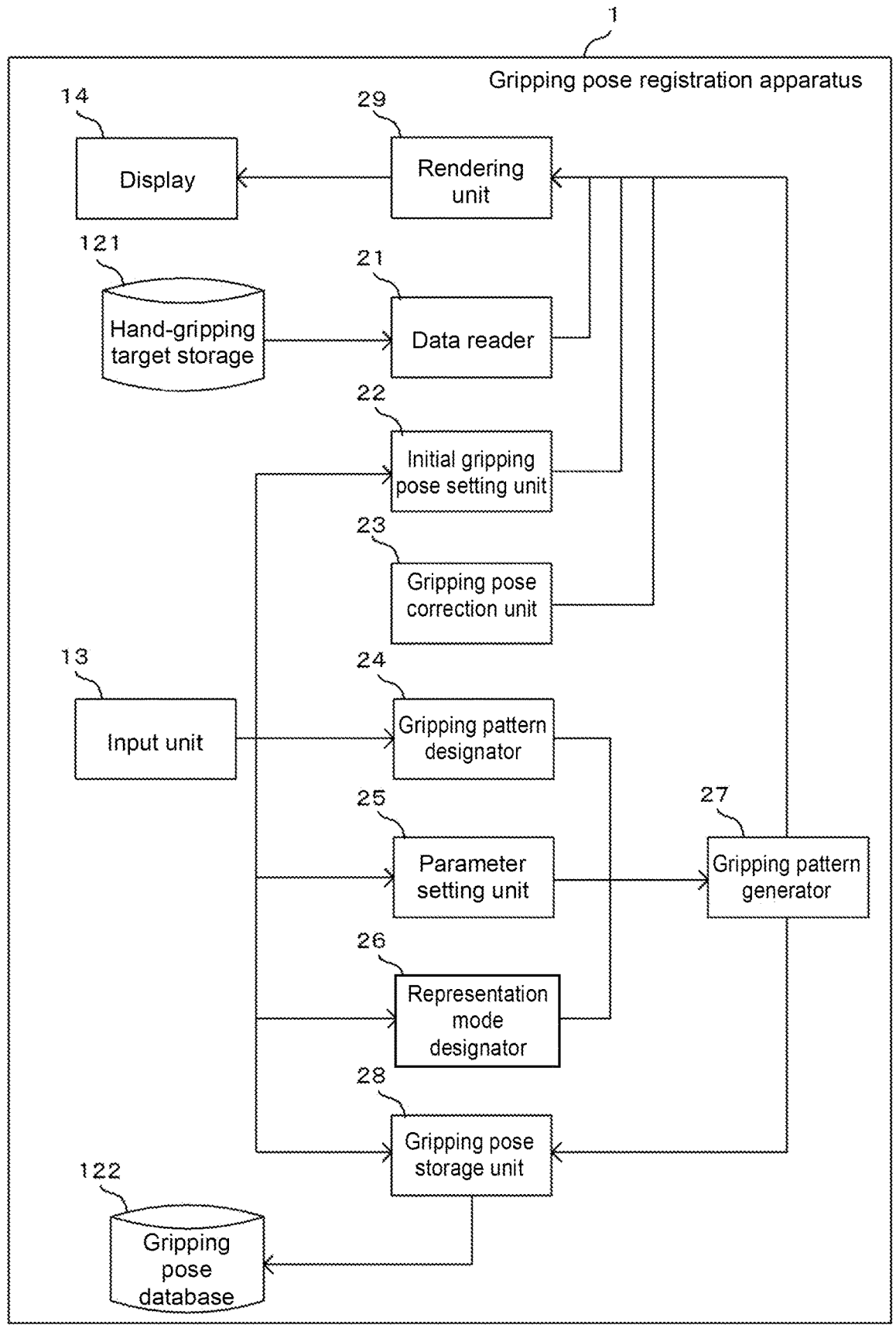
FIG. 2 is a functional block diagram of the gripping pose registration apparatus according to the embodiment of the present invention.

FIG. 1 is a block diagram of a gripping pose registration apparatus 1 according to one embodiment showing its example hardware configuration. FIG. 2 is a functional block diagram of the gripping pose registration apparatus 1.

As shown in FIG. 1, the gripping pose registration apparatus 1 mainly includes a controller 11, a storage 12, an input unit 13, a display 14, and a bus 15 connected to each component and serving as a signal transmission path. The gripping pose registration apparatus 1 may be implemented using a general-purpose computer.

The controller 11 is a processor such as a central processing unit (CPU) and a micro-processing unit (MPU).

The storage 12 includes a main storage device and an auxiliary storage device. The main storage device is a memory in which programs executable by the controller 11 and data used by the control programs are expanded. The auxiliary storage device stores, for example, an operating system (OS), various programs, and various tables, and loads the stored programs to a work area in the main storage device and executes the programs to control, for example, each component, and thus implement each function (described later) for a predetermined purpose. The functions may be partly or entirely implemented by a hardware circuit such as an application-specific integrated circuit (ASIC) and a field-programmable gate array (FPGA). The main storage device may include a random-access memory (RAM) or a read-only memory (ROM). The auxiliary storage device may include an erasable programmable ROM (EPROM) or a hard disk drive (HDD). The auxiliary storage device may additionally include a removable medium, or a portable recording medium. The removable medium may be, for example, a universal serial bus (USB) memory device or a disc storage medium such as a compact disc (CD) and a digital versatile disc (DVD).

The input unit 13 receives input operations from a user. In the present embodiment, the input unit 13 includes a keyboard 13a and a mouse 13b.

The display 14 displays information to provide information to a user. The display 14 includes, for example, a liquid crystal display and its controller. The display 14 may include a touchscreen panel and its controller to also serve as the input unit 13.

Referring to the functional block diagram of FIG. 2, the functions of the gripping pose registration apparatus 1 according to the present embodiment will be described.

The gripping pose registration apparatus 1 includes a data reader 21, an initial gripping pose setting unit 22, a gripping pose correction unit 23, a gripping pattern designator 24, a parameter setting unit 25, a representation mode designator 26, a gripping pattern generator 27, a gripping pose storage unit 28, and a rendering unit 29.

The data reader 21 reads, from a hand-gripping target storage 121 storing data about a robot hand (hereafter simply referred to as a hand) to be controlled and a gripping target to be gripped by the hand, data about the hand and the gripping target.

When a user moves a pointer to an intended position on a gripping target appearing on the display 14 and clicks the mouse 13b at the position, the initial gripping pose setting unit 22 registers the hand at the position.

When the user inputs a correction amount of a gripping pose through the input unit 13, the gripping pose correction unit 23 corrects the gripping pose of the hand by reflecting the correction amount. In this embodiment, the initial gripping pose setting unit 22 and the gripping pose correction unit 23 correspond to a gripping pose setting unit.

The gripping pattern designator 24 receives, from the user through the input unit 13, designation of a type of a gripping pattern, such as fan-shaped gripping, cylinder gripping, circle gripping, or hybrid gripping, and reflects the type in the gripping pattern.

The parameter setting unit 25 receives, from the user through the input unit 13, the setting of a parameter associated with the gripping pattern, and reflects the parameter in the gripping pattern.

The representation mode designator 26 receives, from the user through the input unit 13, designation of a representation mode for displaying a gripping pattern on the display 14, and reflects the representation mode in the gripping pattern.

The gripping pattern generator 27 calculates one or more gripping patterns designated by the gripping pattern designator 24 and generates the gripping patterns.

The gripping pose storage unit 28 stores one or more registered gripping poses into a gripping pose database 122.

The rendering unit 29 generates rendering information about the three-dimensional shapes of the gripping target and the hand based on information input from the data reader, the initial gripping pose setting unit 22, the gripping pose correction unit 23, and the gripping pattern generator 27, and renders the shapes on the display 14. In response to every user operation performed through the input unit in a graphical user interface (GUI) on the display 14, the rendering unit 29 recalculates the poses of the gripping target and the hand at three dimensional positions, and updates the display data on the display 14.

A gripping pose registration process performed by the gripping pose registration apparatus 1 according to the present embodiment will now be described.

Figure 3:
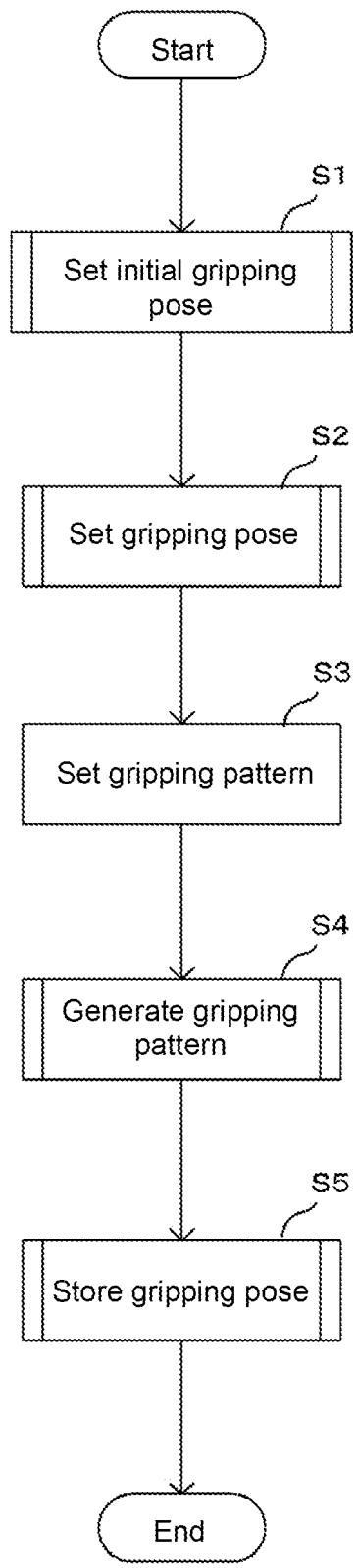
FIG. 3 is a flowchart showing an overall gripping pose registration process in the embodiment of the present invention.

FIG. 3 is a flowchart showing an overall gripping pose registration process.

The gripping pose registration process mainly includes an initial gripping pose setting process (step S1), a gripping pose setting process (step S2), a gripping pattern setting process (step S3), and a gripping pose storing process (step S4).

The initial gripping pose setting process and the gripping pose setting process of a hand relative to a gripping target on the screen of the display 14 will first be described, and then the gripping pattern registration characteristic of the gripping pose registration apparatus 1 according to the present embodiment will be described.

Initial Gripping Pose Setting Process

The initial gripping pose setting process will now be described. Any appropriate procedure may be used for setting an initial gripping pose of a hand relative to a gripping target. The initial gripping pose setting process is performed by the controller 11 executing, in response to an operational input from the keyboard 13a and the mouse 13b, predetermined programs to function as the data reader, the initial gripping pose setting unit, and the rendering unit 29.

Figure 4B:
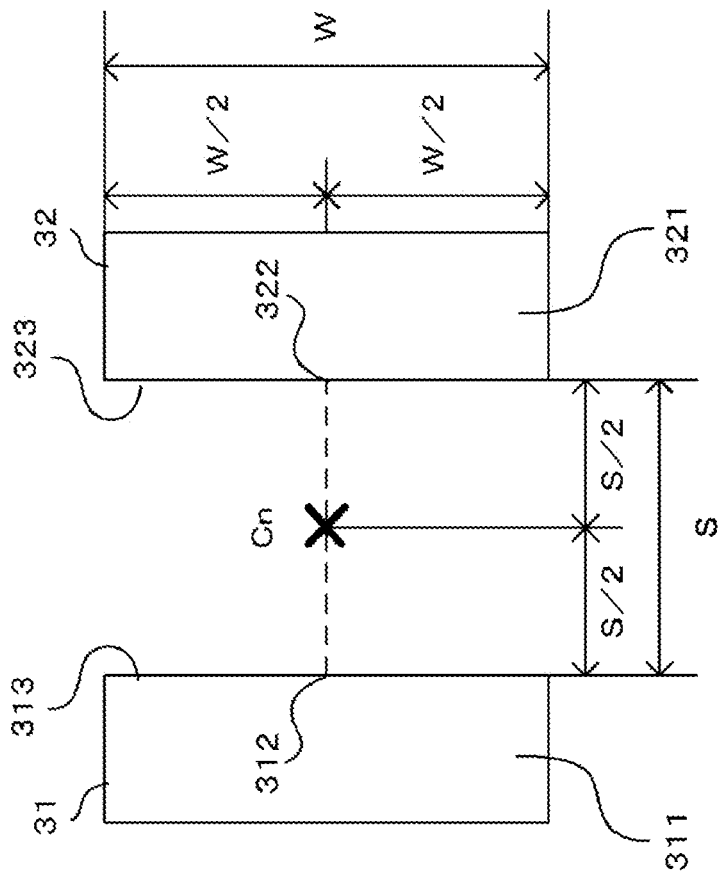
FIG. 4B is an enlarged view of the distal ends of the two-finger hand.
Figure 4A:
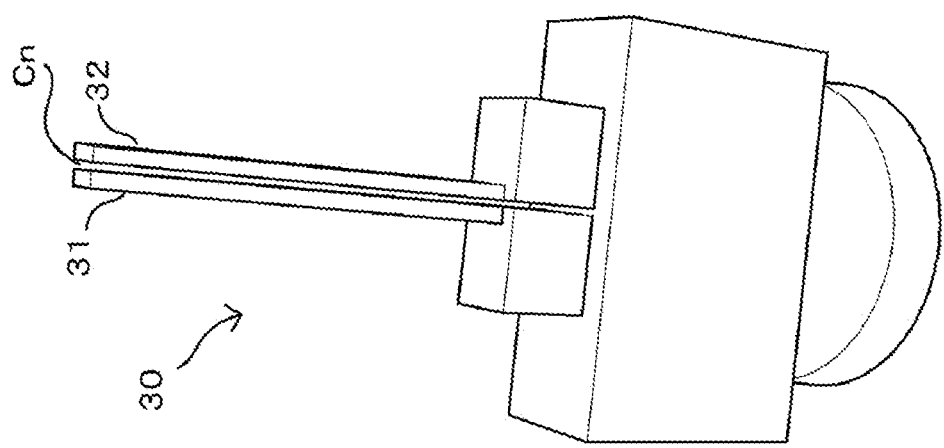
FIG. 4A is a perspective overall view of a two-finger hand in the embodiment of the present invention.
Figure 5B:
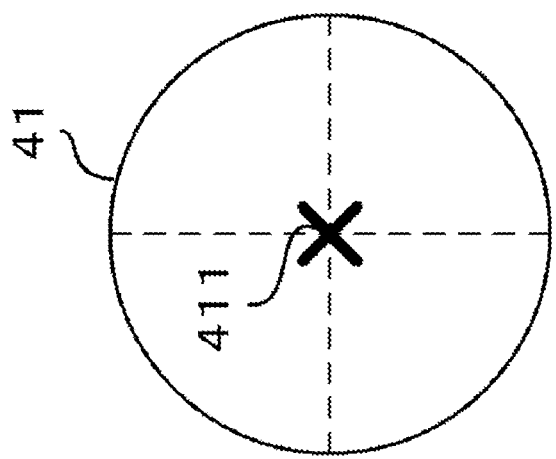
FIG. 5B is an enlarged view of the distal end of the suction hand.
Figure 5A:
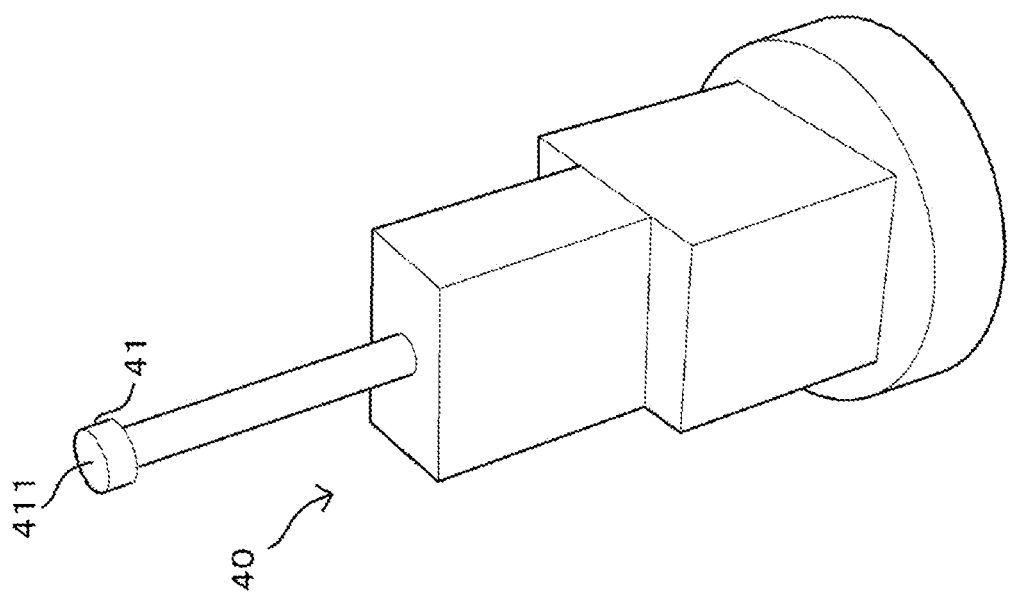
FIG. 5A is a perspective overall view of a suction hand in the embodiment of the present invention.

First, data about the hand and the gripping target is read from the hand-gripping target storage in the storage 12. Based on the read data, the rendering unit 29 displays the gripping target two-dimensionally on the screen of the display 14 in accordance with a predetermined program. In this case, a hand is selected by the user from a two-finger hand 30 including two jaws 31 and 32 as shown in FIG. 4A and a suction hand 40 including a suction pad 41 at its distal end as shown in FIG. 5A. In response to the selection by the user, data about the hand is obtained and displayed. The hand is selected from the two-finger hand 30 and the suction hand 40 in this embodiment, but may be of another type.

The pose of the gripping target is changeable in three degrees of freedom in translation and rotation in response to an operation of, for example, moving a pointer to a position on the gripping target appearing on the screen and dragging the gripping target. The gripping position for the hand is specified by an operation such as moving a pointer onto the gripping target displayed in an intended pose on the screen of the display 14 and clicking.

Figure 6A:
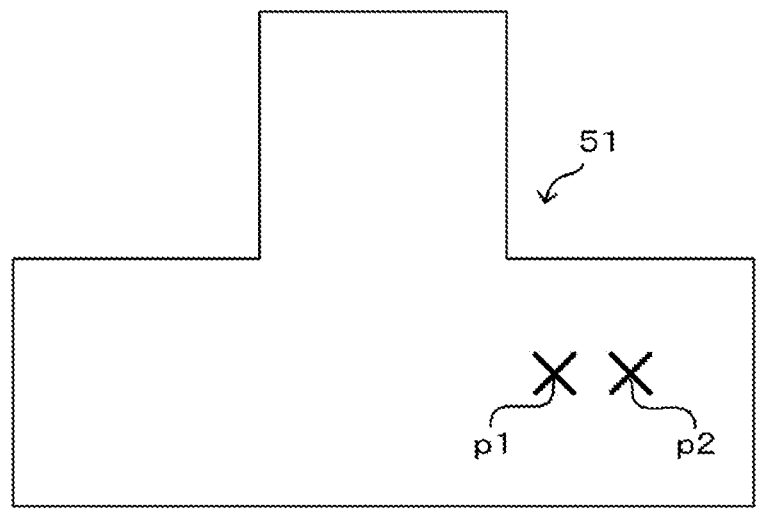
FIGS. 6A and 6B are diagrams each describing the setting of an initial gripping pose of a hand in the embodiment of the present invention.

When the two-finger hand 30 is selected, two points p1 and p2 on a T-tube 51 as a gripping target are specified as shown in FIG. 6A. The two-finger hand 30 is displayed with a midpoint 312 of the distal end of the jaw 31 in the middle between the specified two positions p1 and p2. The gripping position is thus registered. The jaw 32 on the two-finger hand 30 may be registered at a position symmetrical to the jaw 31 with the T-tube 51 in between, or a gripping position for the jaw 32 may be specified independently of the jaw 31. In this embodiment, the jaws 31 and 32 correspond to gripper parts. FIG. 4B shows end faces 311 and 321 as viewed in the longitudinal direction of the jaws 31 and 32 on the two-finger hand 30. The midpoints 312 and 322 on the distal ends of the jaws 31 and 32 are the positions at which the end faces 311 and 321 meet inner surfaces 313 and 323. FIG. 4B also shows a width W of the jaw 32 (the same for the jaw 31) and a width S of the opening between the jaws 31 and 32. As described later, the portions of the jaws 31 and 32 that grip a gripping target may be changed in the longitudinal direction. Thus, other portions of the jaws 31 and 32 may be registered in setting the initial gripping pose.

Figure 6B:
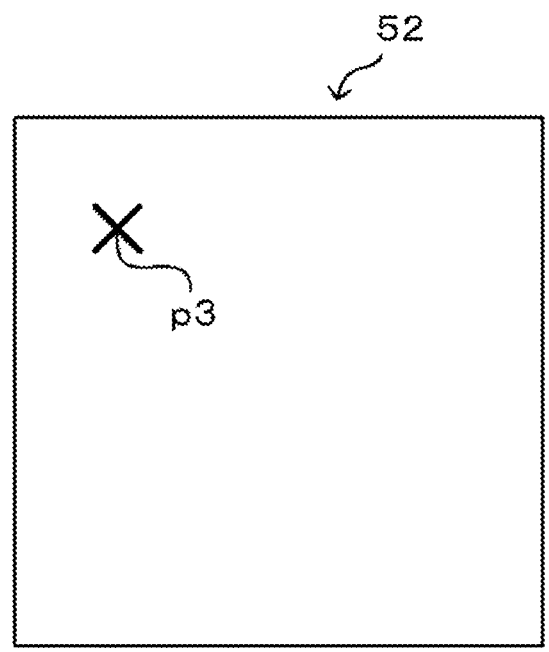

When the suction hand 40 is selected, a single point p3 on a capacitor 52 as a gripping target is specified as shown in FIG. 6B. The suction hand 40 is displayed to have, on its distal end, the suction pad 41 having a center 411 at the point p3. The gripping position is thus registered. In this embodiment, the suction pad 41 corresponds to a gripper part.

Gripping Pose Setting Process

The gripping pose setting process performed for the initial gripping pose of the hand set in accordance with the above procedure will now be described. The gripping pose setting process is performed by the controller 11 executing, in response to an operational input from the keyboard 13a and the mouse 13b, predetermined programs to function as the data reader, the gripping pose correction unit 23, and the rendering unit 29.

In the gripping pose setting process, the pose of the hand gripping the gripping target at a gripping point is adjusted. In this embodiment, for example, with respect to X-axis, Y-axis, and Z-axis of a tool coordinate system defined for the hand (refer to FIG. 15), the amounts of forward and backward motions in X-, Y-, and Z-directions in three degrees of translational freedom and the amounts of rotations about X-, Y-, and Y-axes in three degrees of rotational freedom are adjusted by the user through the GUI on the display 14. For the two-finger hand 30, the width S (refer to FIG. 4B) of the opening between the jaws 31 and 32 may be adjustable. The suction hand 40 typically includes a bellows or a spring and is extendable and retractable. The suction hand 40 may be adjustable in an extended state and a retracted state. Other items may be adjusted in the pose adjustment at the gripping point.

Rotational Gripping Pattern Setting Process

The gripping pose of the hand relative to the gripping target is set as described above. The above process is followed by the gripping pattern setting process. A rotational gripping pattern setting process included in the gripping pattern setting process will now be described. The rotational gripping pattern setting process is performed by the controller 11 executing, in response to an operational input from the keyboard 13a and the mouse 13b, predetermined programs to function as the data reader 29, the gripping pattern designator 24, the parameter setting unit 25, the representation mode designator 26, the gripping pattern generator 27, and the rendering unit 29.

FIG. 7 shows an example user interface 20 appearing on the screen of the display 14 when the rotational gripping pattern setting process is performed.

Five buttons 21 to 25 appearing in an upper portion each represent the respective gripping patterns. An intended gripping pattern is set by moving a pointer onto the corresponding button and clicking the mouse 13b.

Figure 8:
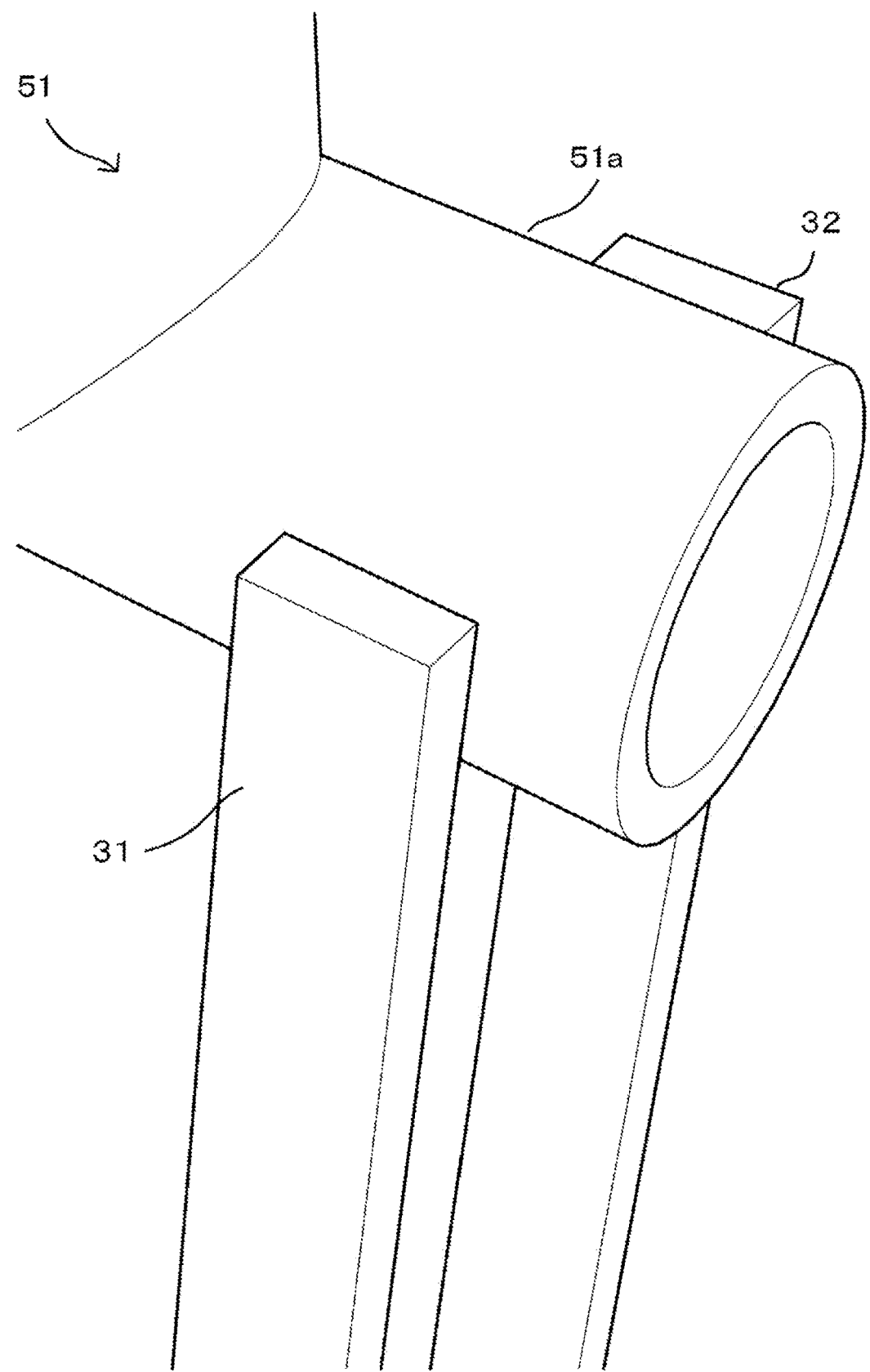
FIG. 8 is a diagram showing gripping with no gripping pattern in the embodiment of the present invention.

The button 21 for the indication "Single" represents no gripping pattern in which the hand is located in a single pose relative to the gripping target. FIG. 8 shows an example of gripping using no gripping pattern. In this example, the two-finger hand 30 is located in a single pose relative to the T-tube 51 when the jaws 31 and 32 on the two-finger hand 30 grip a tubular portion 51a of the T-tube 51 as a gripping target from radially outside.

Figure 9:
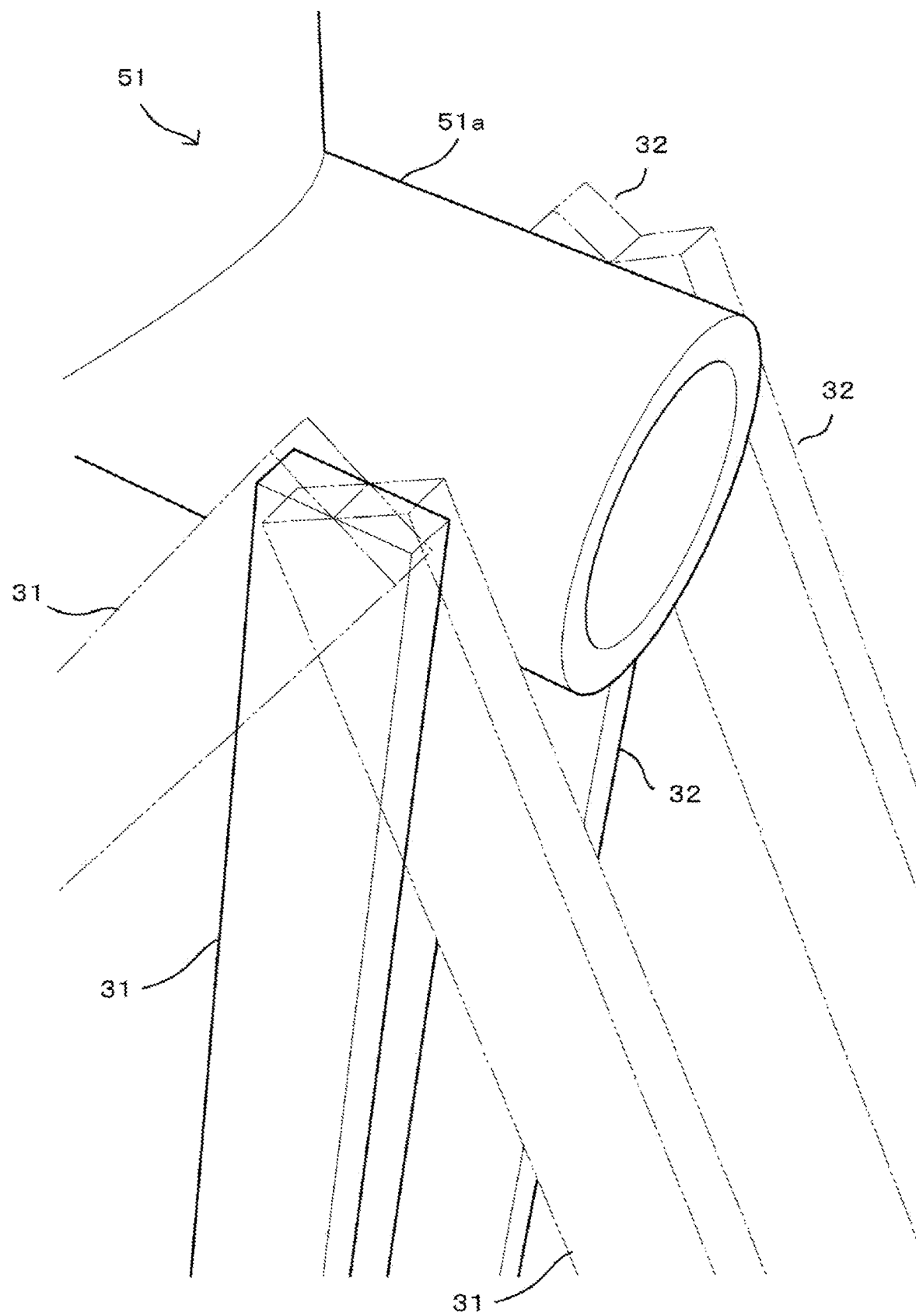
FIG. 9 is a diagram showing a fan-shaped pattern in the embodiment of the present invention.

The button 22 for the indication "Fan" represents a fan-shaped pattern. In the fan-shaped pattern, the two-finger hand 30 is rotated in a fan shape from the initial gripping pose relative to the gripping target about a straight line connecting the midpoints of the distal ends of the jaws 31 and 32. In this embodiment, the fan-shaped pattern corresponds to a first type. FIG. 9 shows an example of the fan-shaped pattern. FIG. 9 shows the two-finger hand 30 at the initial gripping position with the jaws 31 and 32 gripping the tubular portion 51a of the T-tube 51 as a gripping target from vertically below and radially outside. FIG. 9 also shows, in a manner superimposed on the two-finger hand 30 at the initial gripping position, the two-finger hand 30 rotated in the fan-shaped pattern and positioned rightward and leftward relative to the vertically downward direction. The range of rotation and the number of partitions can be changed as described later. The gripping poses of the jaws 31 and 32 on the hand 30 included in a gripping pattern may be indicated by solid lines or two-dot chain lines for easily distinguishable from each other (the same applies to the subsequent drawings).

Figure 10:
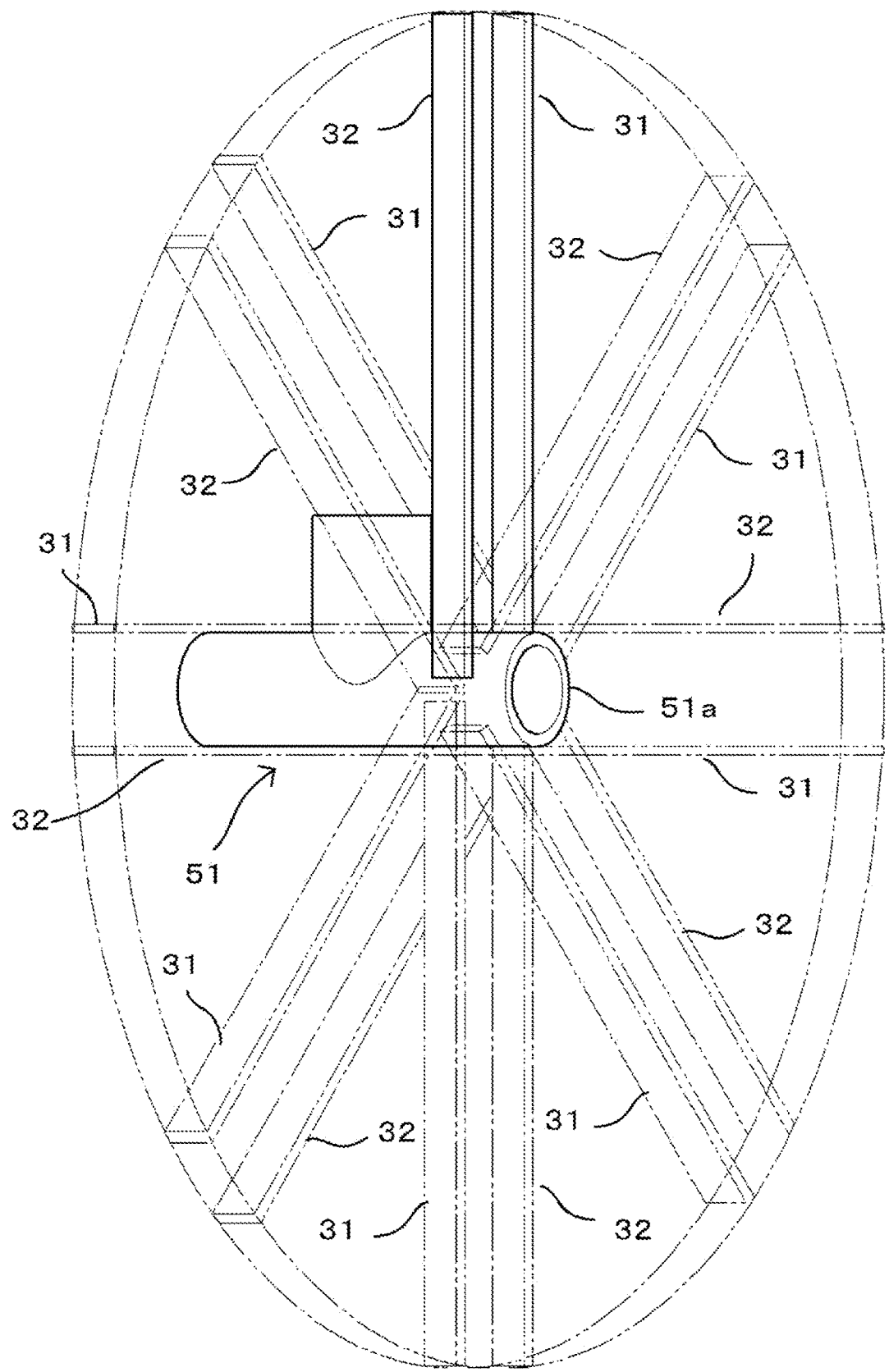
FIG. 10 is a diagram showing a cylinder pattern in the embodiment of the present invention.

The button 23 for the indication "Cylinder" represents a cylinder pattern. In the cylinder pattern, the two-finger hand 30 is rotated from the initial gripping pose relative to the gripping target about a straight line that is orthogonal to a plane including a straight line connecting the midpoints of the distal ends of the jaws 31 and 32 and parallel to the longitudinal direction of the jaws 31 and 32, and that passes through the middle of the straight line connecting the midpoints of distal ends of the two fingers. In this embodiment, the cylinder pattern corresponds to a second type. FIG. 10 shows an example of the cylinder pattern. In FIG. 10, the jaws 31 and 32 on the two-finger hand 30 gripping the T-tube 51 (refer to FIG. 8) are rotated in the cylinder pattern. For ease of understanding, FIG. 10 selectively shows the jaws 31 and 32 positioned in the vertical direction, in the horizontal direction, and rotated 45° with respect to the horizontal direction. The range of rotation and the number of partitions can be changed as described later. For easy understanding of the positional relationship of the jaws 31 and 32 in different poses, the rotation centers and other positions in the drawings including FIG. 10 showing the poses of the two-finger hand 30 relative to the gripping target may not be precisely as described above.

Figure 11A:
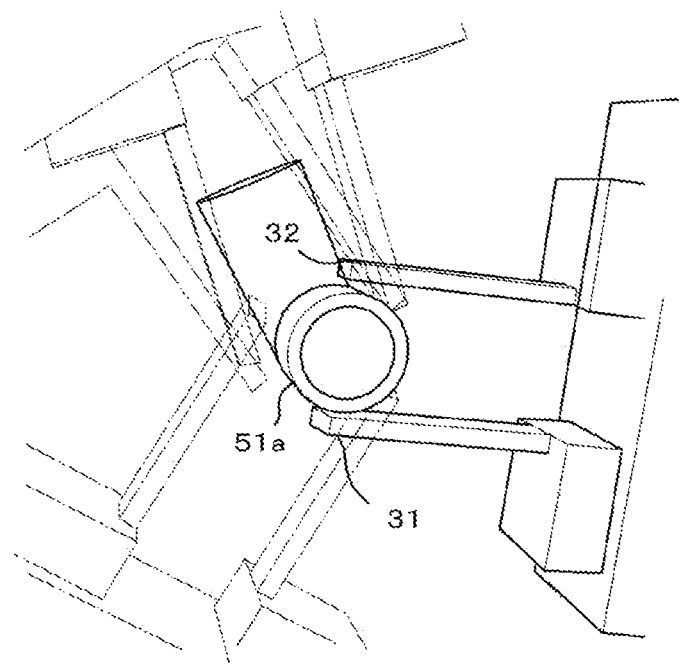
FIGS. 11A and 11B are diagrams describing a change in a gripping depth in the embodiment of the present invention.
Figure 11B:
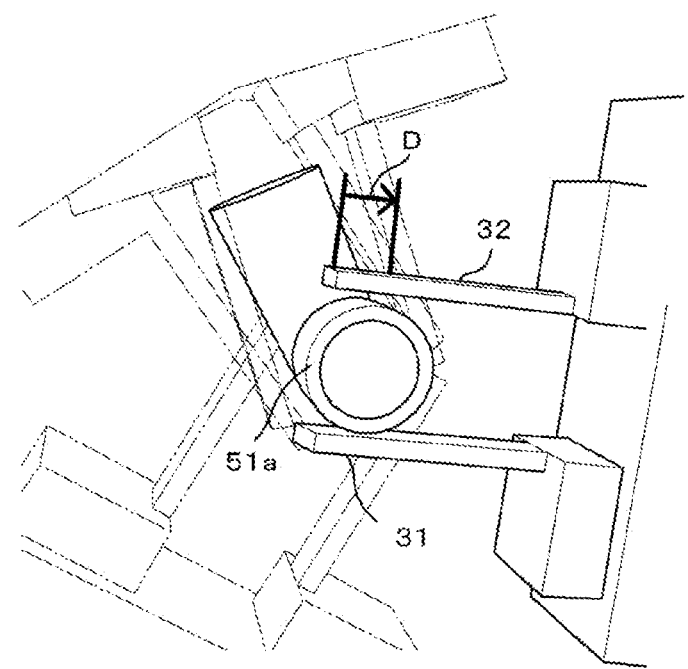

As shown in FIGS. 11A and 11B, the rotation center of the hand can be changed toward the basal end of the hand. This changes the distance by which the hand is moved with respect to and over the gripping target (gripping depth). The jaws 31 and 32 on the two-finger hand 30 in FIG. 11B are moved further by a distance D with respect to the tubular portion 51a of the T-axis tube 51 than in FIG. 11A in which the rotation center is in the middle of a straight line connecting the distal ends of the jaws 31 and 32. The rotation center of the two-finger hand 30 is thus changed closer to the basal end of the two-finger hand 30 than the rotation center in the gripping position in FIG. 11A.

Figure 12:
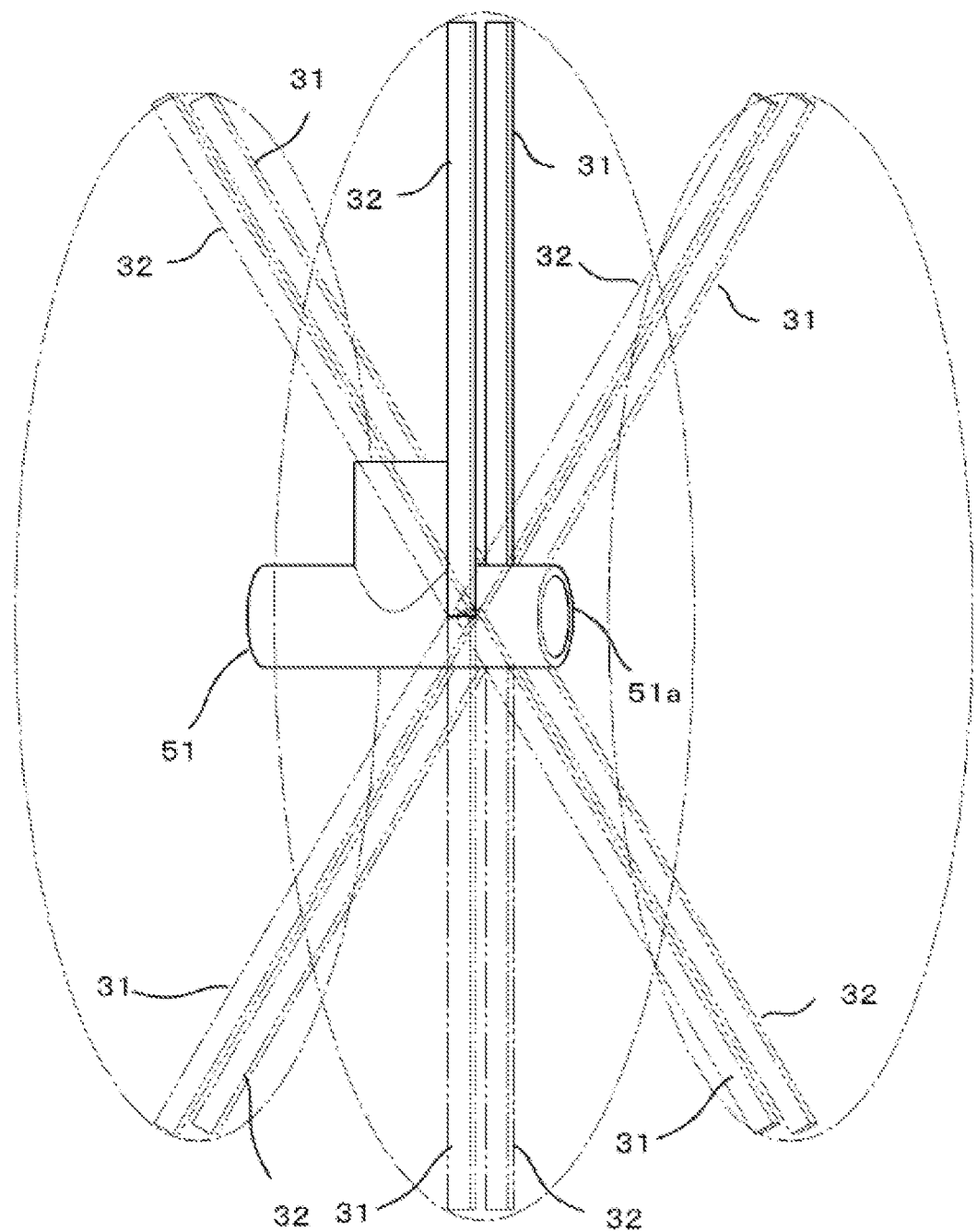
FIG. 12 is a diagram showing a hybrid pattern in the embodiment of the present invention.

The button 24 for the indication "Hybrid" represents a hybrid pattern combining the fan-shaped pattern and the cylinder pattern. More specifically, as described above, the two-finger hand 30 is rotated in a fan shape from the initial gripping pose relative to a gripping target about a straight line connecting the midpoints of the distal ends of the jaws 31 and 32, and is further rotated about a straight line that is orthogonal to a plane including a straight line connecting the midpoints of the distal ends of the jaws 31 and 32 and parallel to the longitudinal direction of the jaws 31 and 32, and that passes through the middle of the straight line connecting the midpoints of distal ends of the jaws 31 and 32. In this embodiment, the hybrid pattern corresponds to a fourth type. FIG. 12 shows the two-finger hand 30 rotated in the fan-shaped pattern, and the two-finger hand 30 further rotated in the cylinder pattern. FIG. 12 selectively shows the two-finger hand 30 rotated in the fan-shaped pattern and positioned rightward and leftward relative to the vertical direction, and selectively shows the two-finger hand 30 rotated in the cylinder pattern and positioned upward and downward in the vertical direction for ease of understanding. The range of rotation and the number of partitions can be changed as described later.

Figure 13:
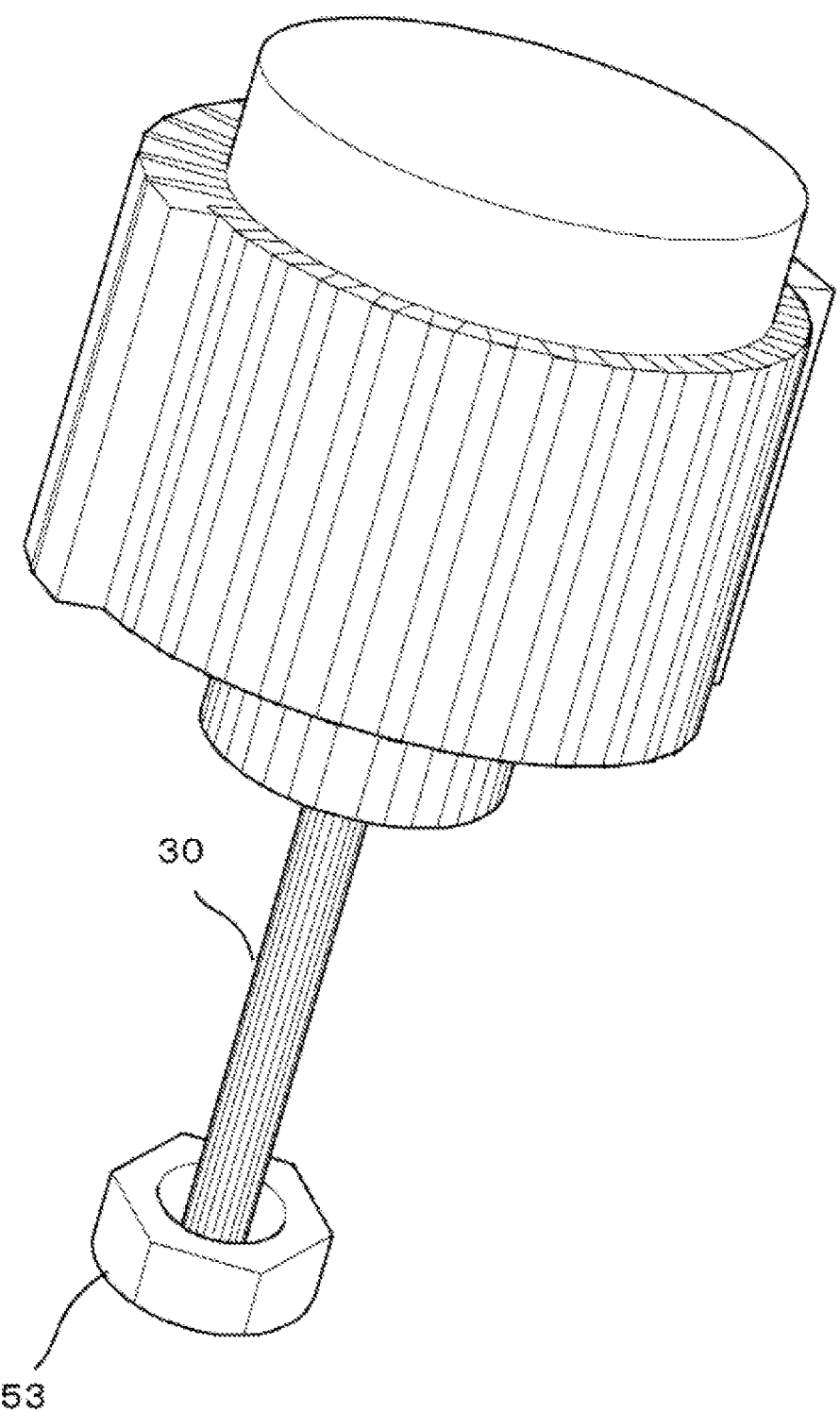
FIG. 13 is a diagram of a circle pattern in the embodiment of the present invention.

The button 25 for the indication "Circle" represents a circle pattern. The circle pattern is used when, for example, the two-finger hand 30 is inserted into the hollow of a nut as a gripping target 50 and opens the jaws 31 and 32 wider to push the inner peripheral surface of the hollow nut and thus to grip the nut. In this embodiment, the circle pattern corresponds to a third type. In this pattern, the two-finger hand 30 is rotated about an axis that passes through a middle Cn (refer to FIG. 4B) of a straight line connecting the midpoints 312 and 322 of the distal ends of the jaws 31 and 32 and is parallel to the longitudinal direction of the jaws 31 and 32. FIG. 13 shows, in a superimposed manner, the two-finger hand 30 rotated with respect to the nut 50 in the circle pattern.

The user interface 20 displays, in its lower portion, an indication 26a of "Start angle," an indication 27a of "Stop angle," and an indication 28a of "Num angle," and the corresponding buttons 26b, 27b, and 28b each with the − mark, and buttons 26c, 27c, and 28c each with the + mark.

The buttons 26b and 26c for the indication "Start angle" are used to adjust the start angle of a pattern defined by multiple gripping positions when the range for generating a gripping pattern is set. The initial position of the hand gripping the gripping target is defined as 0 degrees on the display 14. Using the above angle as a reference, the start angle is incremented by clicking the button 26c with the + mark, and is decremented by clicking the button 26b with the − mark. In this embodiment, the start angle corresponds to a start parameter.

The buttons 27b and 27c for the indication "Stop angle" are used to adjust the end angle of a pattern defined by multiple gripping positions when the range for generating a gripping pattern is set. The initial position of the hand gripping the gripping target is defined as 0 degrees on the display 14. Using the above angle as a reference, the end angle is incremented by clicking the button 27c with the + mark, and is decremented by clicking the button 27b with the − mark. In this embodiment, the end angle corresponds to an end parameter.

The buttons 28b and 28c for the indication "Num angle" are used to adjust the number of partitions in the range for generating a gripping pattern, or between the start angle and the end angle described above. The initial number of partitions may be set as appropriate, for example, to 0. Using this as a reference, the number of partitions is incremented by clicking the button 28c with the + mark, and is decremented by clicking the button 28b with the − mark. In this embodiment, the number of partitions corresponds to a unit parameter.

Rotational Gripping Pattern Generation Process

Figure 14:
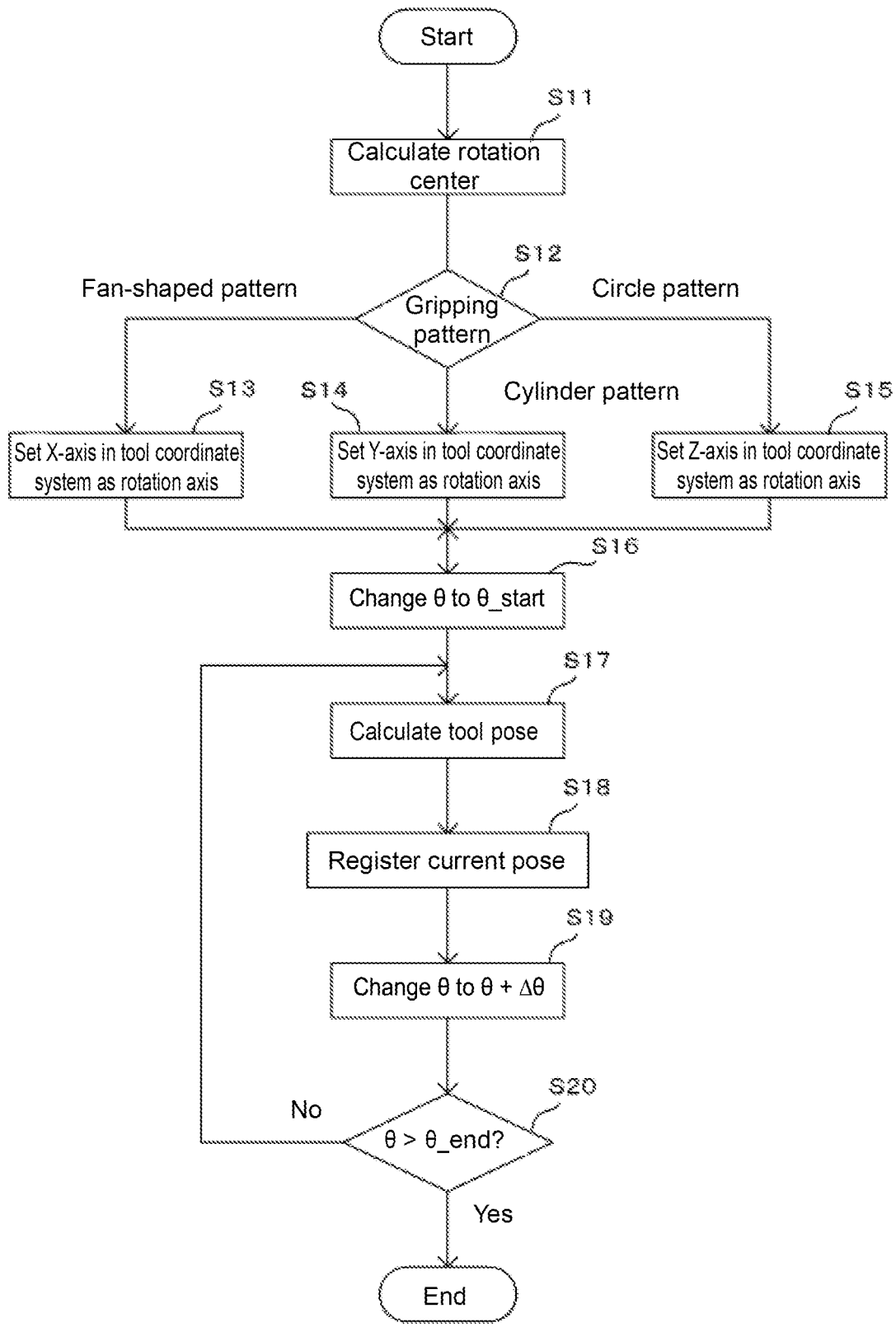
FIG. 14 is a flowchart showing a gripping pattern generation process in the embodiment of the present invention.

FIG. 14 is a flowchart showing a process for generating any gripping pattern specified as above.

First, the rotation center is calculated (step S11).

In this step, the rotation center is set for generating a gripping pattern. For the two-finger hand 30, for example, the middle Cn of a straight line connecting the midpoints 312 and 322 of the distal ends of the left jaw 31 and the right jaw 32 is set as the rotation center as shown in FIG. 4B. For the suction hand 40, the center 411 on the end face of the suction pad 41 is set as the rotation center as shown in FIG. 5B. The rotation center C is set in this manner.

The determination is then performed as to which gripping pattern is selected by the user (step S12).

Figure 15:
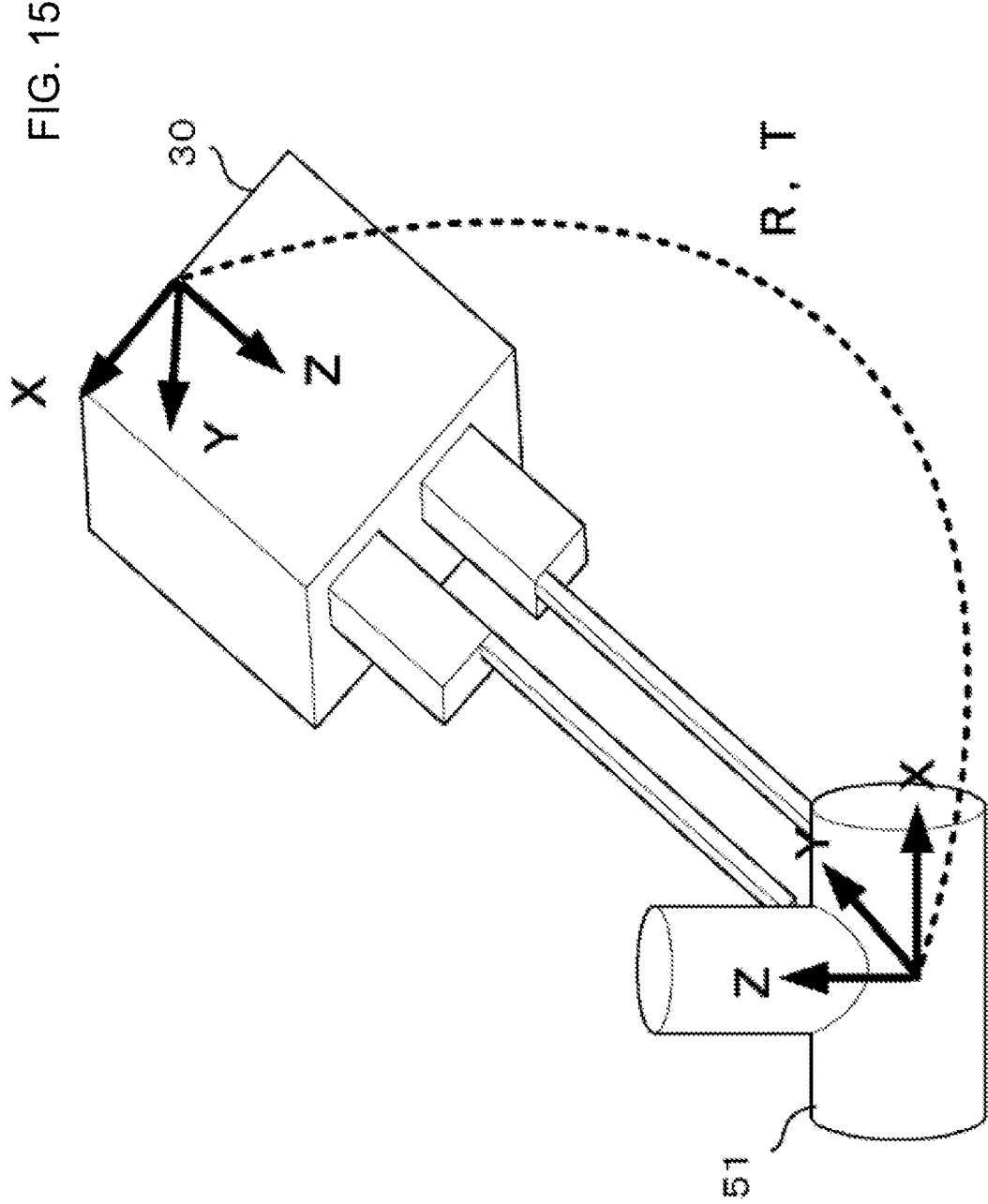
FIG. 15 is a diagram showing the relationship between an object coordinate system and a tool coordinate system in the embodiment of the present invention.

When the fan-shaped pattern is selected, the rotation axis is set to X-axis of the tool coordinate system (step S13). When the cylinder pattern is selected, the rotation axis is set to Y-axis of the tool coordinate system (step S14). When the circle pattern is selected, the rotation axis is set to Z-axis of the tool coordinate system (step S15). FIG. 15 shows the tool coordinate system defined for the hand 30 and the object coordinate system defined for the T-tube 51 as a gripping target.

A rotation start angle θ_start previously set using the buttons 26b and 26c for the indication "Start angle" is set as a rotation angle θ about a rotation axis set in step S3, S4, or S5 (step S16).

The pose of the tool is then calculated (step S17).

As shown in FIG. 15, the relative pose of the hand 30 and the T-tube 51 as a gripping target before a gripping pattern is generated (more specifically, after the initial gripping pose setting process and the gripping pose setting process described above) may be written using the rotation matrix R
(as R in the text) and a translation vector
T
(as T in the text). This is the initial pose.

In any gripping pattern, the hand is rotated about X-axis, Y-axis, or Z-axis of the tool coordinate system from the initial pose. When the hand is rotated by θ degrees, the rotation matrix for such rotation
ΔR
can be calculated as described below.

For the fan-shaped gripping pattern, or more specifically, when the rotation axis is X-axis, the rotation matrix is $$\Delta R = \begin{pmatrix} 1 & 0 & 0 \\ 0 & \cos\theta & -\sin\theta \\ 0 & \sin\theta & \cos\theta \end{pmatrix}$$

For the cylinder gripping pattern, or more specifically, when the rotation axis is Y-axis, the rotation matrix is $$\Delta R = \begin{pmatrix} \cos\theta & 0 & \sin\theta \\ 0 & 1 & 0 \\ -\sin\theta & 0 & \cos\theta \end{pmatrix}$$

For the circle gripping pattern, or more specifically, when the rotation axis is Z-axis, the rotation matrix is $$\Delta R = \begin{pmatrix} \cos\theta & -\sin\theta & 0 \\ \sin\theta & \cos\theta & 0 \\ 0 & 0 & 1 \end{pmatrix}$$

The rotation matrix of the gripping pattern
$R_{pattern}$
(as R_pattern in the text) and the translation vector
$T_{pattern}$
(as T_pattern in the text) can be calculated using the formulas below.

$$R_{pattern} = R\Delta R$$

$$T_{pattern} = T + C - R\Delta R C$$

The rotation matrix for the pattern combining the fan-shaped pattern and the cylinder pattern is obtained by combining these rotations.

The current pose of the tool (hand) calculated in this manner is registered to a predetermined area in the storage 12 (step S18).

The rotation angle θ of the hand is changed to θ+Δθ (step S19). The value Δθ can be obtained by dividing the range between the start angle set using the buttons 26b and 26c for the indication "Start angle" and the end angle set using the buttons 27b and 27c for the indication "Stop angle" by the number of partitions set using the buttons 28b and 28c for the indication "Num angle."

The determination is then performed as to whether θ>θ_end (step S20).

The angle θ_end is set using the buttons 27b and 27c for the indication "Stop angle."

FIGS. 16 and 17A to 17C show the relative relationship between the T-tube 51 as a gripping target and the two-finger hand 30 in the cylinder pattern described above.

Figure 16:
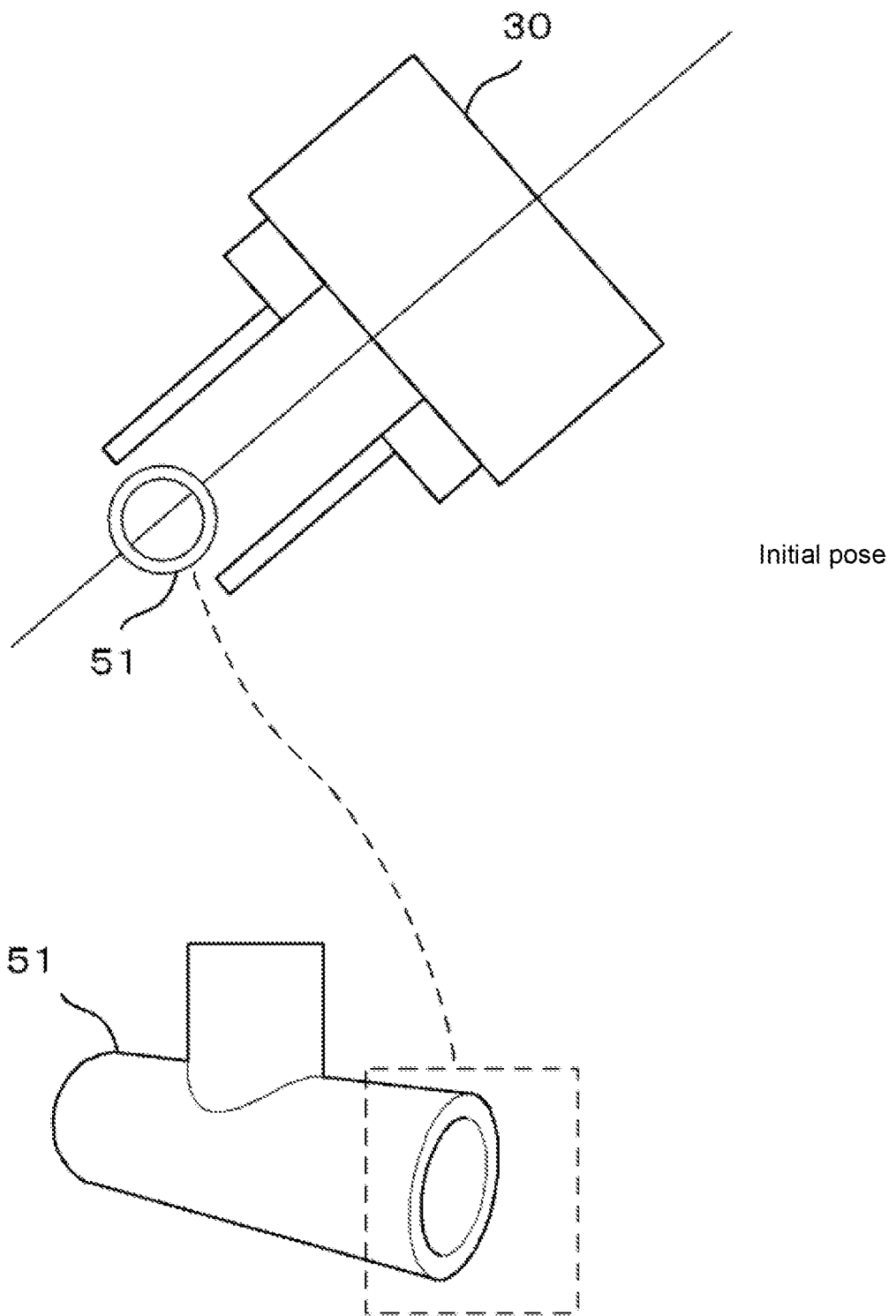
FIG. 16 is a diagram showing the relationship between a T-tube and the two-finger hand in the cylinder pattern in the embodiment of the present invention.
Figure 17A:
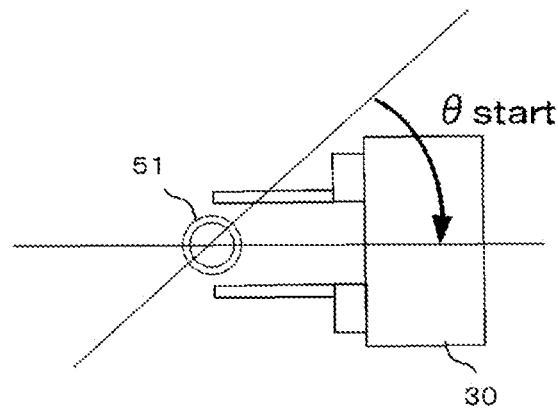
FIGS. 17A, 17B, and 17C are diagrams each showing the positional relationship between the T-tube and the two-finger hand in the cylinder pattern in the embodiment of the present invention.
Figure 17B:
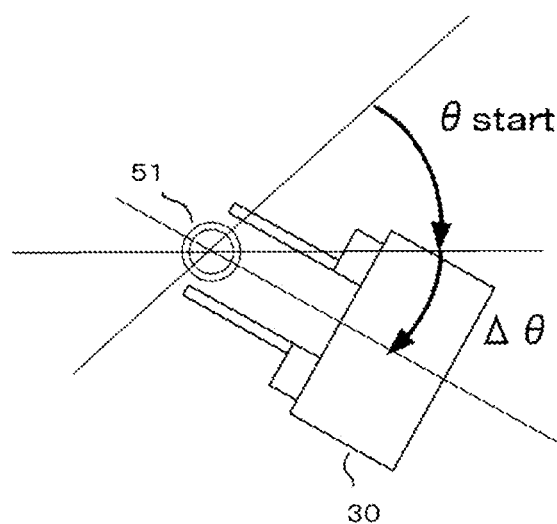
Figure 17C:
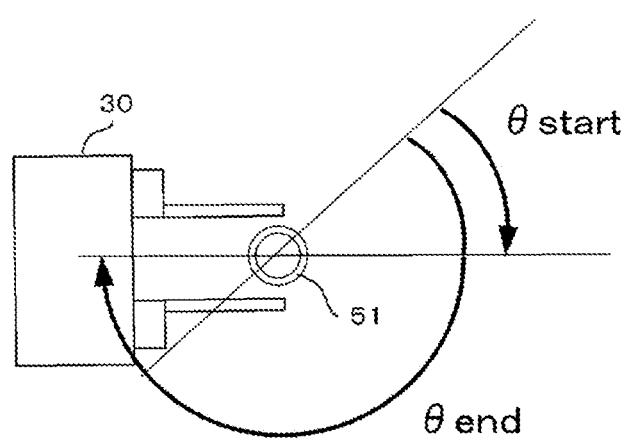

FIG. 16 shows the two-finger hand 30 in the initial pose relative to the T-tube 51. The lower part of FIG. 16 shows an overall perspective view of the T-tube 51 and shows its portion corresponding to the end face of the T-tube 51 shown in the upper part of FIG. 16. FIG. 17A shows the two-finger hand 30 rotated by θstart from the initial pose to the start angle. FIG. 17B shows the two-finger hand 30 further rotated by AB from the start angle. FIG. 17C shows the two-finger hand 30 rotated from the start angle θstart to the end angle θend.

When the determination result is affirmative (Yes) in step S20, the gripping pattern generation process ends.

When the determination result is negative (No) in step S20, the processing returns to step S17 to calculate the pose of the tool at the updated rotation angle.

When the current pose of the tool is calculated in step S17, the determination may be performed as to whether the tool collides with the gripping target. Any pose with no such collision may then be registered in step S18. Any known technique may be used as appropriate for the determination about the collision with the gripping target, and will not be described in detail.

Equal-Interval Gripping Pattern Setting Process

An equal-interval gripping pattern setting process included in the gripping pattern setting process will now be described. The equal-interval gripping pattern setting process is performed by the controller 11 executing, in response to an operational input from the keyboard 13a and the mouse 13b, predetermined programs to function as the data reader 29, the gripping pattern designator 24, the parameter setting unit 25, the representation mode designator 26, the gripping pattern generator 27, and the rendering unit 29.

The equal-interval gripping pattern includes gripping points located at equal intervals in either or both X- and Y-directions of the tool coordinate system. In this embodiment, the equal-interval gripping pattern corresponds to a fifth type. The user predefines, using the keyboard 13a or the mouse 13b, an initial position (Xstart, Ystart) and an end position (Xend, Yend) in X- and Y-directions as well as an interval (ΔX, ΔY) between adjacent gripping points. In this embodiment, Xstart and Ystart correspond to start parameters. Xend and Yend correspond to end parameters. ΔX and ΔY correspond to unit parameters.

Equal-Interval Gripping Pattern Generation Process

Figure 18:
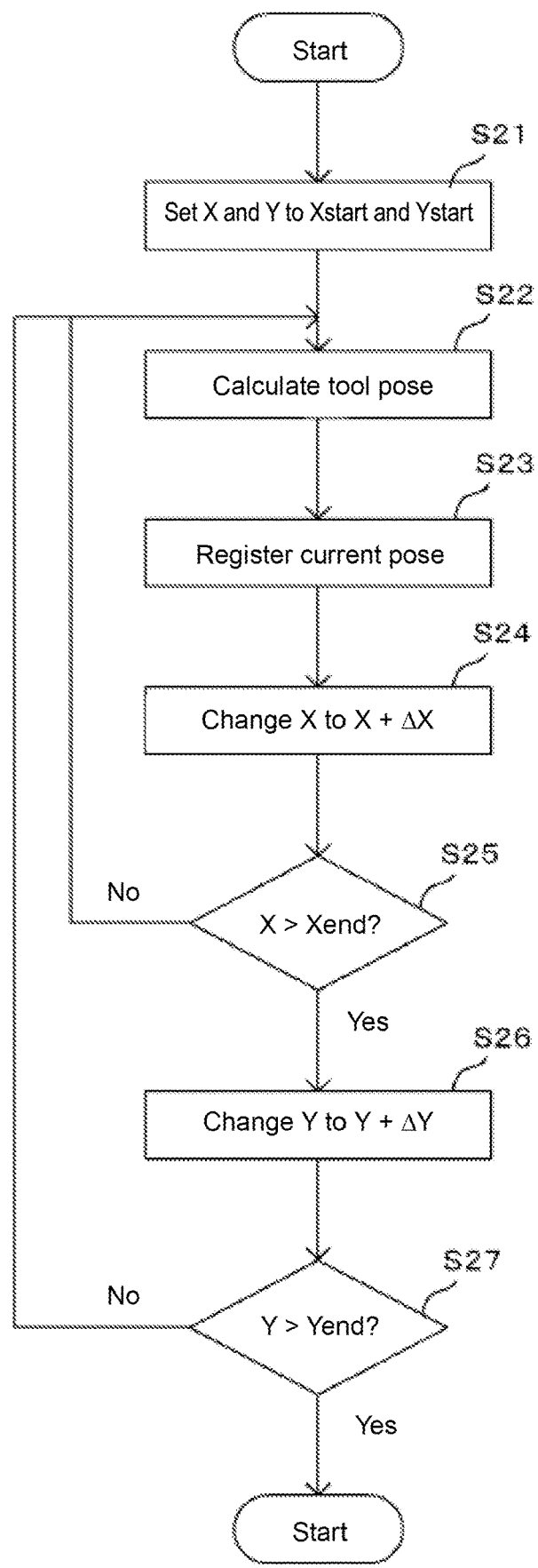
FIG. 18 is a flowchart showing an equal-interval gripping pattern generation process in the embodiment of the present invention.

An equal-interval pattern generation process will now be described with reference to the flowchart in FIG. 18.

First, X and Y are set to Xstart and Ystart defined by the user (step S21).

Subsequently, the pose of the tool is calculated (step S22).

The relationship between the relative pose of the hand and the gripping target before a gripping pattern is generated, the rotation matrix $R_{pattern}$, and the translation vector $T_{pattern}$ is the same as shown in FIG. 15.

In the equal-interval gripping pattern setting process, the tool is translated from the initial pose along X- and Y-axes of the tool coordinate system. When the tool is translated by (X, Y), the rotation matrix $R_{pattern}$ and the translation vector $T_{pattern}$ can be calculated as described below.

$$R_{pattern} = R$$

$$T_{pattern} = R \begin{pmatrix} X \\ Y \\ 0 \end{pmatrix} + T$$

The calculated current pose of the tool (hand) is registered to a predetermined area in the storage 12 (step S23). The rendering unit 29 displays the registered current pose of the tool (hand) on the display 14.

The X-coordinate position of the hand is changed to X+ΔX (step S24).

The determination is then performed as to whether X>Xend (step S25).

When the determination result is negative (No) in step S25, the processing returns to step S22 to calculate the pose of the tool at the updated X-coordinate position.

When the determination result is affirmative (Yes) in step S25, the Y-coordinate position of the hand is changed to Y+ΔY (step S26).

The determination is then performed as to whether Y>Yend (step S27).

When the determination result is affirmative (Yes) in step S27, the equal-interval gripping pattern setting process ends.

When the determination result is negative (No) in step S27, the processing returns to step S22 to calculate the pose of the tool at the updated Y-coordinate position.

Although the tool is translated in X- and Y-directions at equal intervals in this embodiment, the tool may be translated in Z-direction or in directions including Z-direction at equal intervals.

The equal-interval gripping pattern may be used not only for the suction hand 40 described above, but also for, for example, the two-finger hand 30 with the jaws 31 and 32 holding an erect wall, such as an edge of a box, between them and moving along the edge.

When the current pose of the tool is calculated in step S22, the determination may be performed as to whether the tool collides with the gripping target. Any pose with no such collision may then be registered in step S23. Any known technique may be used as appropriate for the determination about the collision with the gripping target, and will not be described in detail.

FIG. 19 shows a gripping pattern generated through the equal-interval gripping pattern generation process described above. The suction hand 40 with the suction pad 41 in contact with the upper surface of the gripping target 50 is translated on the upper surface in X- and Y-directions at equal intervals to define a gripping pattern.

Figure 20A:
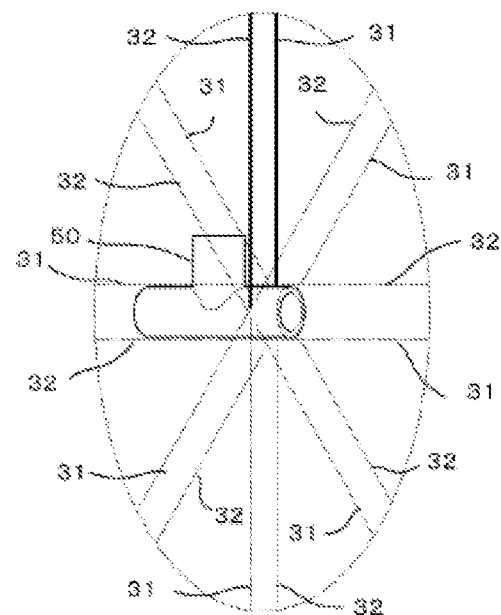
FIGS. 20A and 20B are diagrams each showing a simplified display example of a gripping pattern in the embodiment of the present invention.
Figure 20B:
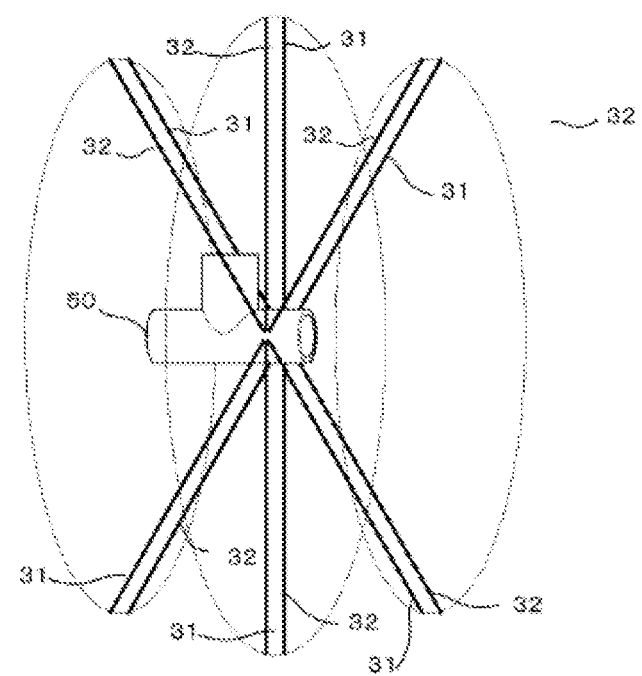

When any gripping pattern described above appears on the display 14, the hand may appear in a common, stereoscopic representation mode as described above. The hand in each gripping pose relative to the gripping target and in each gripping pattern may appear in another representation mode. As the number of gripping poses increases, more images of the hand overlap one another and are thus less distinguishable from one another. In FIGS. 20A and 20B, the hand appears in a simplified mode to simply represent the outline of the hand by lines. Another representation mode may be used to simply represent the contour of the path taken by gripping poses of the hand included in a gripping pattern. The user selects a representation mode through the input unit 13 for selecting the type of a gripping pattern or for setting parameters. The representation mode for the hand can be switched through the input unit 13 when a gripping pattern appears on the display 14.

For ease of understanding, FIGS. 20A and 20B selectively show some of the gripping poses included in the gripping pattern. FIG. 20A corresponds to FIG. 10. FIG. 20B corresponds to FIG. 12. The hand is represented differently between these diagrams. The hand indicated with lines in a simplified manner allows the user to easily distinguish many gripping patterns and thus to set and register a gripping pattern efficiently.

Gripping Pose Storing Process

Figure 21:
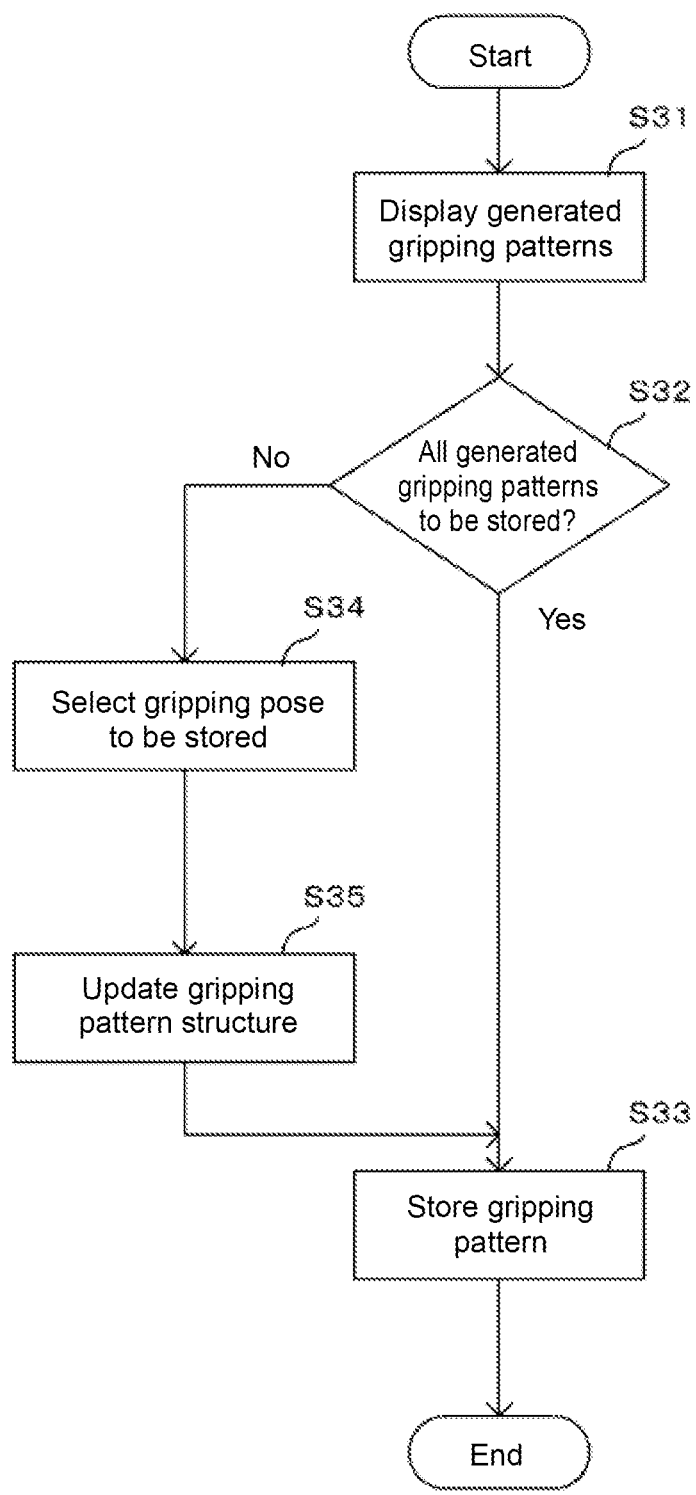
FIG. 21 is a flowchart showing a gripping pose storing process in the embodiment of the present invention.

FIG. 21 is a flowchart showing the gripping pose storing process.

The gripping pose storage unit 28 displays multiple gripping poses generated through the pattern generation process on the display 14 as shown in, for example, FIG. 9 (step S31). In this state, the gripping pose storage unit 28 displays, on the screen of the display 14, buttons for selecting whether all the appearing gripping patterns are to be stored or gripping poses to be stored are to be specified, and receives the selection from the user.

When the user selects, through the input unit 13, the button for storing all the gripping poses, the gripping pose storage unit 28 determines that the determination result is affirmative (Yes) in step S32, and stores all the gripping poses included in the generated gripping pattern into the gripping pose database 122 (step S32). When the user selects the button for selecting gripping poses to be stored, the gripping pose storage unit 28 receives, from the user through the input unit 13, the selection of gripping poses to be stored from among the multiple gripping poses appearing on the display 14 (step S34). For example, the user selects a gripping pose to be stored by clicking one or more of the gripping poses appearing on the display 14. The user may click gripping poses not to be stored. When the user selects one or more gripping poses to be stored, the gripping pose storage unit 28 updates the structure of the gripping pattern in accordance with the selection by the user (step S35), and stores the updated gripping pattern into the gripping pose database 122. The user may exclude any gripping pose with which the robot hand collides with the gripping target from the gripping pattern.

The user can select one or more gripping poses to be stored from the generated gripping pattern. The user can thus store an intended gripping pattern. This structure also allows a gripping pattern to include one or more intended gripping poses and thus eliminates the setting of the number of partitions.

Figure 22A:
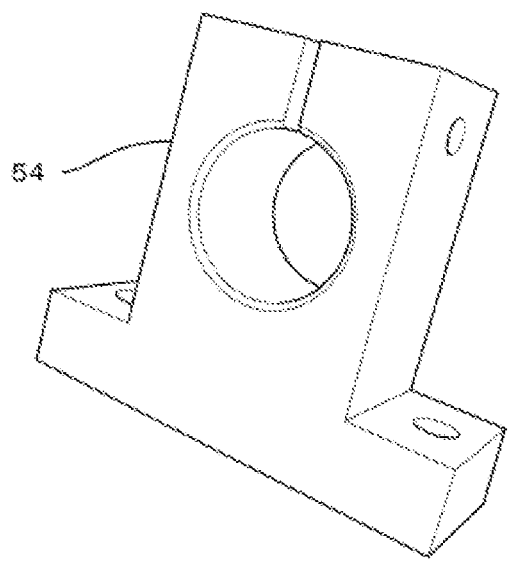
FIGS. 22A and 22B are diagrams showing a gripping pattern for a holder in the embodiment of the present invention.
Figure 22B:
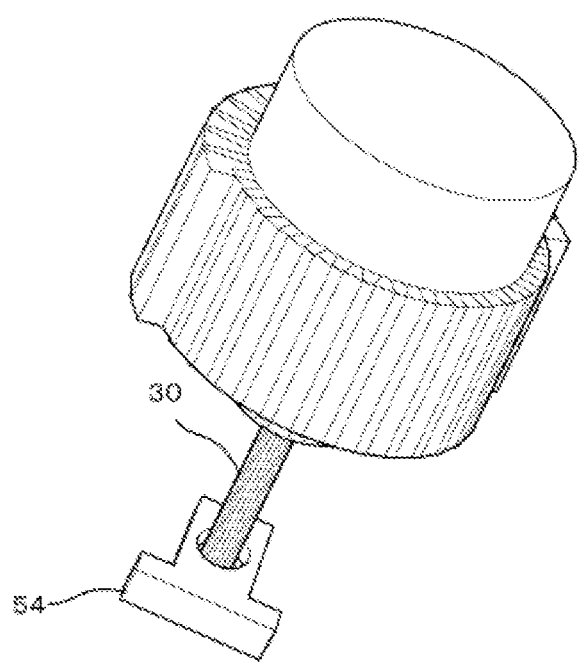
Figure 23A:
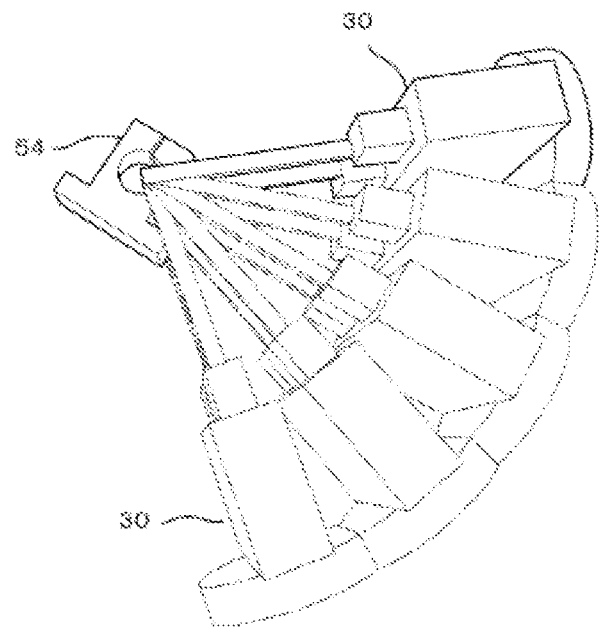
FIGS. 23A and 23B are diagrams showing another gripping pattern for a holder in the embodiment of the present invention.
Figure 23B:
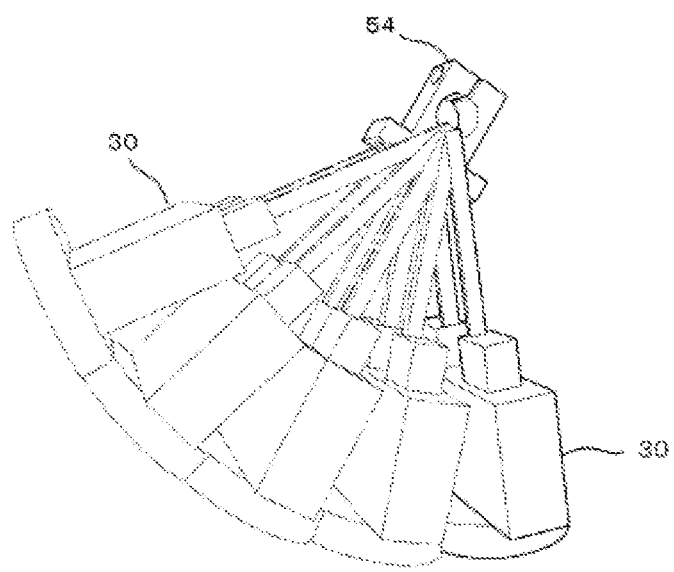

FIG. 22A shows a holder 54 as a gripping target. FIGS. 22B, 23A, and 23B show gripping patterns for the holder 54 in the present embodiment. FIG. 23B shows the two-finger hand 30 gripping the holder 54 in the circle pattern. FIG. 23A shows the two-finger hand 30 gripping the holder 54 in the fan-shaped pattern. FIG. 23B shows the fan-shaped pattern with a different rotation range.

Figure 24A:
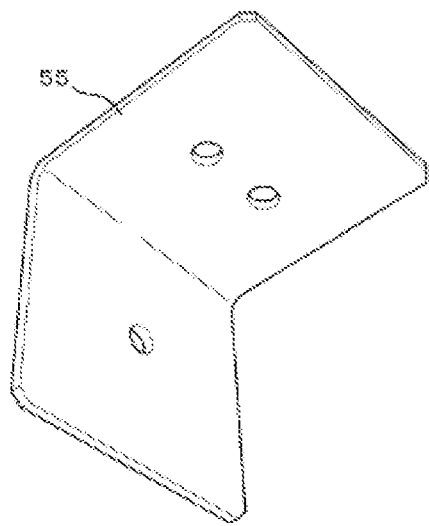
FIGS. 24A, 24B, and 24C are diagrams showing gripping patterns for an L-shaped plate in the embodiment of the present invention.
Figure 24B:
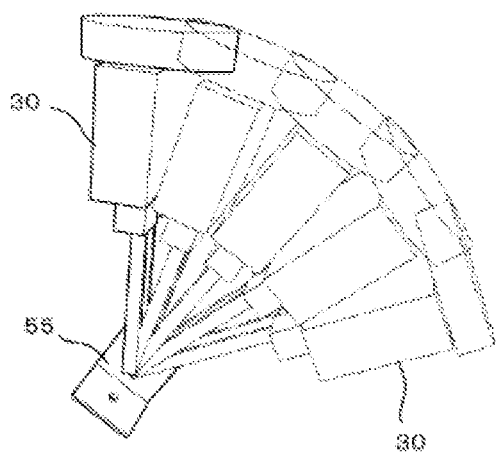
Figure 24C:
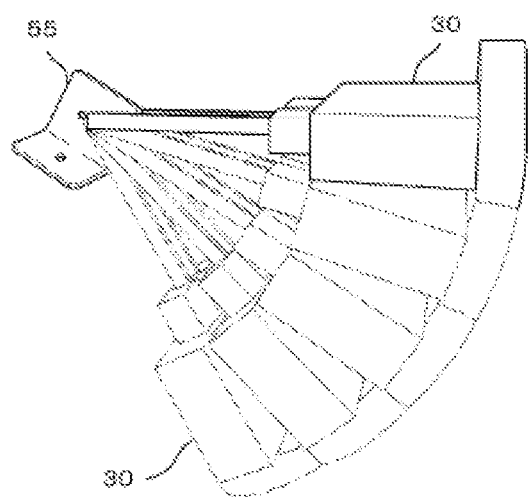

FIG. 24A shows an L-shaped plate 55 as a gripping target. FIGS. 24B and 24C show example rotational gripping patterns for the L-shaped plate 55 in the present embodiment. FIG. 24B shows the two-finger hand 30 gripping the L-shaped plate 55 in the fan-shaped pattern. FIG. 24C shows the fan-shaped pattern with a different rotation range.

Figure 25A:
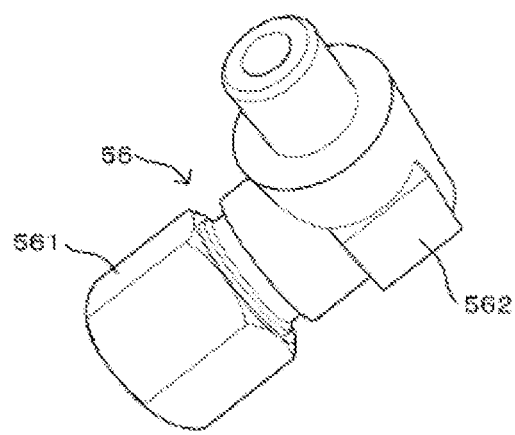
FIGS. 25A, 25B, and 25C are diagrams showing gripping patterns for a connector in the embodiment of the present invention.
Figure 25B:
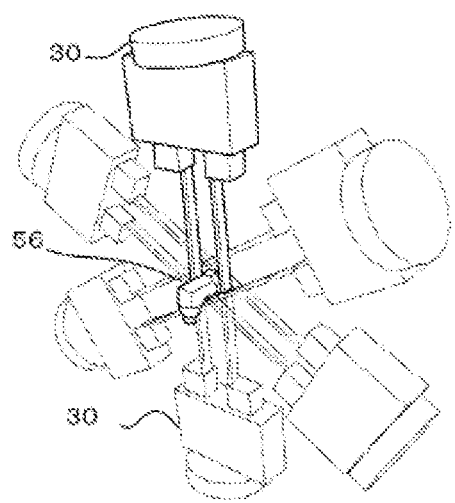
Figure 25C:
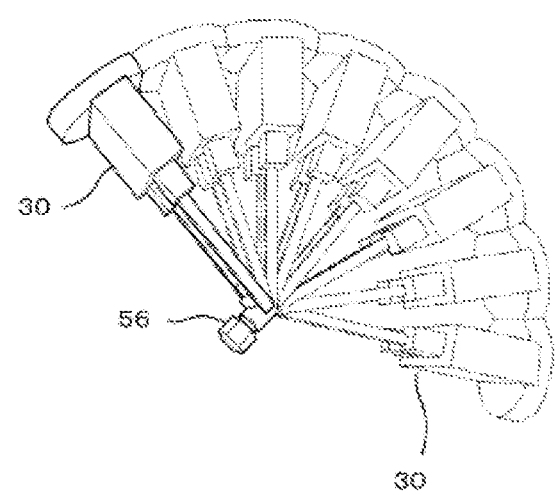

FIG. 25A shows a connector 56 as a gripping target. FIGS. 25B and 25C show example rotational gripping patterns for the connector 56 in the present embodiment. FIG. 25B shows the two-finger hand 30 gripping a hexagonal portion 561 of the connector 56 in the circle pattern. FIG. 25C shows the two-finger hand 30 gripping an L-shaped bend 562 of the connector in the fan-shaped pattern.

Figure 26A:
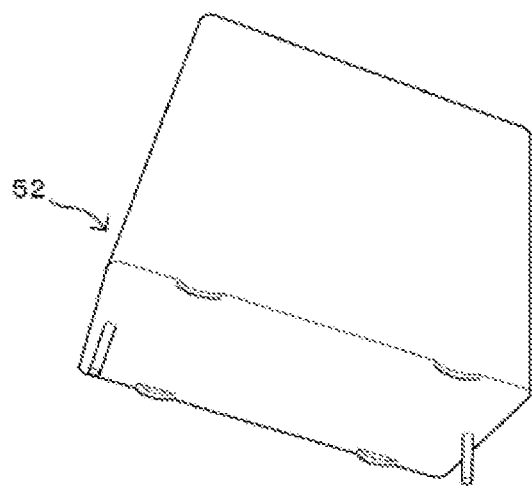
FIGS. 26A, 26B, and 26C are diagrams showing gripping patterns for a capacitor in the embodiment of the present invention.
Figure 26B:
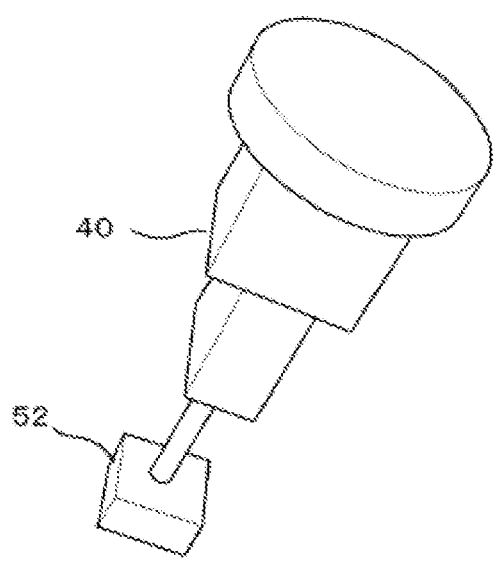
Figure 26C:
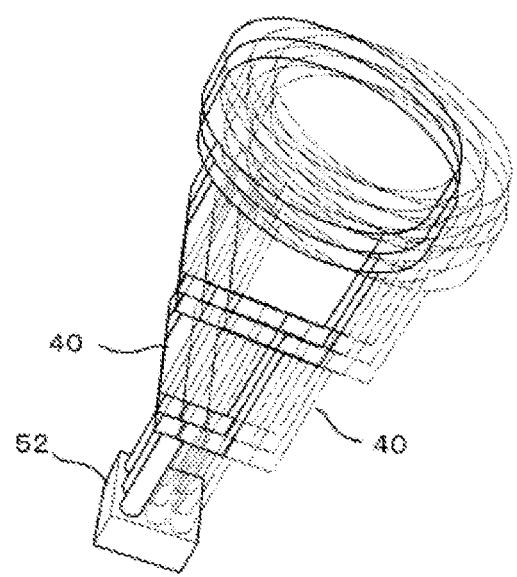

FIG. 26A shows a capacitor 52 as a gripping target. FIG. 26B shows the suction hand 40 gripping the capacitor 52 with no gripping pattern. FIG. 26C shows the equal-interval gripping pattern.

Modifications

Although the above embodiment describes a two-finger hand and a suction hand, the present invention is also applicable to other types of hands including, but not limited to, a three-finger hand or a magnetic hand. Effective patterns may differ depending on the hand type.

The above embodiment describes the rotational gripping patterns including the cylinder pattern, fan-shaped pattern, circle pattern, and their combinations, and the equal-interval gripping pattern. Any of the rotational gripping patterns may be combined with the equal-interval gripping pattern. The present invention is also applicable to other gripping patterns.

Gripping targets may not correspond one-to-one with hands. Gripping patterns of multiple types of hands may be used for a single gripping target. Such gripping patterns of multiple types of hands may be prioritized for each gripping target.

Gripping targets can have a three-dimensional computer-aided design (CAD) file format or a point cloud (measurement data) format, or may have another data format.

Hands can have a three-dimensional CAD file format or a data format based on the shapes specified by the user, or may have another data format.

The elements in the aspects of the present invention below are identified with reference numerals used in the drawings to show the correspondence between these elements and the components in the embodiments.

Aspect 1

A gripping pose registration apparatus (1) for registering a gripping pose of a robot hand (30, 40) relative to a gripping target (51 to 56), the apparatus comprising:

a gripping pose setting unit (22, 23) configured to receive setting of a gripping pose of the robot hand (30, 40) relative to the gripping target (51 to 56) represented three-dimensionally;

a gripping pattern designator (24) configured to receive designation of a type of a gripping pattern including a group of gripping poses;

a gripping pattern generator (27) configured to generate, based on the designated type and the set gripping pose of the robot hand (30, 40), the gripping pattern including the group of gripping poses generated from at least one of rotation about a predetermined axis in a tool coordinate system defined for the robot hand or translation in a predetermined direction in the tool coordinate system; and a gripping pose storage unit (28) configured to store the group of gripping poses included in the generated gripping pattern.

Aspect 2

A gripping pose registration method for registering a gripping pose of a robot hand (30, 40) relative to a gripping target (51 to 56), the method comprising:

receiving setting of a gripping pose of the robot hand (30, 40) relative to the gripping target (51 to 56) represented two-dimensionally (steps S1 and S2);

receiving designation of a type of a gripping pattern including a group of gripping poses (step S3);

generating, based on the designated type and the set gripping pose of the robot hand, the gripping pattern including the group of gripping poses generated from at least one of rotation about a predetermined axis in a tool coordinate system defined for the robot hand or translation in a predetermined direction in the tool coordinate system (step S4); and storing the group of gripping poses included in the generated gripping pattern (step S5).

Aspect 3

A program for causing a computer to implement a gripping pose registration method for registering a gripping pose of a robot hand (30, 40) relative to a gripping target (51 to 56), the program causing the computer to perform operations comprising:

receiving setting of a gripping pose of the robot hand (30, 40) relative to the gripping target (51 to 56) represented two-dimensionally (steps S1 and S2);

receiving designation of a type of a gripping pattern including a group of gripping poses (step S3);

generating, based on the designated type and the set gripping pose of the robot hand, the gripping pattern including the group of gripping poses generated from at least one of rotation about a predetermined axis in a tool coordinate system defined for the robot hand or translation in a predetermined direction in the tool coordinate system (step S4); and storing the group of gripping poses included in the generated gripping pattern (step S5).

REFERENCE SIGNS LIST 1 gripping pose registration apparatus
22 initial gripping pose setting unit
23 gripping pose correction unit
24 gripping pattern designator
25 parameter setting unit
26 representation mode designator
27 gripping pattern generator
28 gripping pose storage unit
29 rendering unit

The invention claimed is:

1. A gripping pose registration apparatus for registering a gripping pose of a robot hand relative to a gripping target, the apparatus comprising:

a gripping pose setting unit configured to receive setting of a gripping pose of the robot hand relative to the gripping target represented three-dimensionally for any shape of the gripping target;

a gripping pattern designator configured to receive designation of a type of a gripping pattern including a group of gripping poses for any shape of the gripping target;

a gripping pattern generator configured to generate, based on the designated type and the set gripping pose of the robot hand, the gripping pattern including the group of gripping poses generated from at least one of rotation about a predetermined axis in a tool coordinate system defined for the robot hand or translation in a predetermined direction in the tool coordinate system; and a gripping pose storage unit configured to store the group of gripping poses included in the generated gripping pattern.

2. The gripping pose registration apparatus according to claim 1, wherein the type of the gripping pattern includes a first type of the gripping pattern including the group of gripping poses generated with an axis in a direction connecting two gripper parts of the robot hand being the predetermined axis.

3. The gripping pose registration apparatus according to claim 1, wherein the type of the gripping pattern includes a second type of the gripping pattern including the group of gripping poses generated with an axis orthogonal to a longitudinal direction of two gripper parts of the robot hand being the predetermined axis.

4. The gripping pose registration apparatus according to claim 1, wherein the type of the gripping pattern includes a third type of the gripping pattern including the group of gripping poses generated with an axis parallel to a longitudinal direction of a gripper part of the robot hand being the predetermined axis.

5. The gripping pose registration apparatus according to claim 1, wherein the type of the gripping pattern includes a fourth type of the gripping pattern including the group of gripping poses generated by combining rotation about an axis in a direction connecting two gripper parts of the robot hand being the predetermined axis and rotation about an axis parallel to a longitudinal direction of at least one of the gripper parts being the predetermined axis or rotation about an axis orthogonal to a longitudinal direction of the two gripper parts being the predetermined axis.

6. The gripping pose registration apparatus according to claim 1, wherein the type of the gripping pattern includes a fifth type of the gripping pattern including the group of gripping poses generated with a direction orthogonal to a longitudinal direction of a gripper part of the robot hand being the predetermined direction.

7. The gripping pose registration apparatus according to claim 1, wherein the gripping pattern designator receives designation of a plurality of the types of the gripping pattern for a single gripping target.

8. The gripping pose registration apparatus according to claim 3, further comprising:

a parameter setting unit configured to receive setting of a parameter for generating the gripping pattern, wherein the parameter includes a gripping depth indicating a position of the axis orthogonal to the longitudinal direction of the two gripper parts.

9. The gripping pose registration apparatus according to claim 1, further comprising:

a parameter setting unit configured to receive setting of a parameter for generating the gripping pattern.

10. The gripping pose registration apparatus according to claim 9, wherein the parameter includes at least one of a start parameter for specifying a gripping pose with which the rotation or the translation is started in generating the gripping pattern or an end parameter for specifying a gripping pose with which the rotation or the translation is ended in generating the gripping pattern.

11. The gripping pose registration apparatus according to claim 8, wherein the parameter includes a unit parameter for specifying a unit for the rotation or the translation of the robot hand for generating the group of gripping poses.

12. The gripping pose registration apparatus according to claim 1, wherein the gripping pattern generator determines, in generating the gripping pattern, whether the robot hand collides with the gripping target and excludes a gripping pose with which the robot hand collides with the gripping target from the set of gripping poses.

13. The gripping pose registration apparatus according to claim 1, further comprising:

a rendering unit configured to generate rendering information for displaying the gripping pattern generated by the gripping pattern generator.

14. The gripping pose registration apparatus according to claim 13, further comprising:
a representation mode designator configured to receive, as the rendering information, designation of a representation mode including a simplified mode for representing an outline of the robot hand corresponding to a gripping pose included in the gripping pattern.

15. The gripping pose registration apparatus according to claim 13, wherein
the gripping pose storage unit receives designation of a gripping pose to be stored from among the group of gripping poses included in the gripping pattern represented three-dimensionally.

16. A gripping pose registration method for registering a gripping pose of a robot hand relative to a gripping target, the method comprising:
receiving setting of a gripping pose of the robot hand relative to the gripping target represented three-dimensionally for any shape of the gripping target;
receiving designation of a type of a gripping pattern including a group of gripping poses for any shape of the gripping target;
generating, based on the designated type and the set gripping pose of the robot hand, the gripping pattern including the group of gripping poses generated from at least one of rotation about a predetermined axis in a tool coordinate system defined for the robot hand or translation in a predetermined direction in the tool coordinate system; and
storing the group of gripping poses included in the generated gripping pattern.

17. A non-transitory computer readable medium storing a program for causing a computer to implement a gripping pose registration method for registering a gripping pose of a robot hand relative to a gripping target, the program causing the computer to perform operations comprising:
receiving setting of a gripping pose of the robot hand relative to the gripping target represented three-dimensionally for any shape of the gripping target;
receiving designation of a type of a gripping pattern including a group of gripping poses for any shape of the gripping target;
generating, based on the designated type and the set gripping pose of the robot hand, the gripping pattern including the group of gripping poses generated from at least one of rotation about a predetermined axis in a tool coordinate system defined for the robot hand or translation in a predetermined direction in the tool coordinate system; and
storing the group of gripping poses included in the generated gripping pattern.

* * * * *